United States Patent
Tang et al.

(10) Patent No.: US 10,444,854 B2
(45) Date of Patent: Oct. 15, 2019

(54) MULTI MEDIA COMPUTING OR ENTERTAINMENT SYSTEM FOR RESPONDING TO USER PRESENCE AND ACTIVITY

(71) Applicant: Apple Inc., Cupertino, CA (US)

(72) Inventors: Feng Tang, Cupertino, CA (US);
Chong Chen, Sunnyvale, CA (US);
Haitao Guo, Cupertino, CA (US);
Xiaojin Shi, Cupertino, CA (US);
Thorsten Gernoth, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/055,994

(22) Filed: Aug. 6, 2018

(65) Prior Publication Data
US 2018/0348885 A1 Dec. 6, 2018

Related U.S. Application Data

(63) Continuation of application No. 14/865,850, filed on Sep. 25, 2015, now Pat. No. 10,048,765.

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/011* (2013.01); *G06F 3/012* (2013.01); *G06F 3/0304* (2013.01);
(Continued)

(58) Field of Classification Search
None
See application file for complete search history.

(56) References Cited

U.S. PATENT DOCUMENTS 7,340,077 B2 3/2008 Gokturk
7,613,313 B2 11/2009 Juppi
(Continued)

FOREIGN PATENT DOCUMENTS

EP 2648425 A1 10/2013

OTHER PUBLICATIONS

Jamie Shotton et al: "Real-time human pose recognition in parts from single depth images," Communications of TEH ACM, Association for Computing Machinery, ICN, United States, vol. 56, No. 1, Jan. 1, 2013 (Jan. 1, 2013), pp. 116-124, XP058010058, ISSN: 0001/0782, DOI: 10.1145/2398356.2398381.
(Continued)

*Primary Examiner* — Nancy Bitar
(74) *Attorney, Agent, or Firm* — Blank Rome LLP

(57) ABSTRACT

Intelligent systems are disclosed that respond to user intent and desires based upon activity that may or may not be expressly directed at the intelligent system. In some embodiments, the intelligent system acquires a depth image of a scene surrounding the system. A scene geometry may be extracted from the depth image and elements of the scene may be monitored. In certain embodiments, user activity in the scene is monitored and analyzed to infer user desires or intent with respect to the system. The interpretation of the user's intent as well as the system's response may be affected by the scene geometry surrounding the user and/or the system. In some embodiments, techniques and systems are disclosed for interpreting express user communication, e.g., expressed through hand gesture movements. In some embodiments, such gesture movements may be interpreted based on real-time depth information obtained from, e.g., optical or non-optical type depth sensors.

14 Claims, 19 Drawing Sheets

(51) Int. Cl.
G06K 9/62 (2006.01)
G06F 3/16 (2006.01)
G06K 9/00 (2006.01)

(52) U.S. Cl.
CPC ............... *G06F 3/16* (2013.01); *G06F 3/165* (2013.01); *G06K 9/00375* (2013.01); *G06K 9/00389* (2013.01); *G06K 9/6269* (2013.01); *G06K 9/6282* (2013.01); *G06K 2209/40* (2013.01)

(56) References Cited

U.S. PATENT DOCUMENTS

| | | | |
|---|---|---|---|
| 8,103,109 | B2 | 1/2012 | Winn |
| 8,315,400 | B2 | 11/2012 | Goldstein |
| 8,351,651 | B2 | 1/2013 | Lee |
| 8,582,867 | B2 | 11/2013 | Litvak |
| 8,761,437 | B2 | 6/2014 | Kirovski |
| 8,788,973 | B2 | 7/2014 | Lavigne |
| 8,823,484 | B2 | 9/2014 | Kennedy |
| 8,878,906 | B2 * | 11/2014 | Shotton .............. G06K 9/00375 348/46 |
| 9,117,281 | B2 | 8/2015 | Hoiem |
| 9,135,392 | B2 | 9/2015 | Raschke |
| 9,147,123 | B2 | 9/2015 | Zeng |
| 9,383,895 | B1 | 7/2016 | Vinayak |
| 9,536,136 | B2 | 1/2017 | Kounavis |
| 9,557,162 | B2 * | 1/2017 | Rodriguez ......... G01C 21/3629 |
| 2005/0190953 | A1 * | 9/2005 | Nagahashi ......... G06K 9/00248 382/118 |
| 2008/0013793 | A1 | 1/2008 | Hillis |
| 2008/0317331 | A1 | 12/2008 | Winn |
| 2010/0021014 | A1 | 1/2010 | Bebis |
| 2010/0277470 | A1 * | 11/2010 | Margolis ............ G06K 9/00342 345/419 |
| 2011/0206273 | A1 | 8/2011 | Plagemann |
| 2011/0293180 | A1 * | 12/2011 | Criminisi ................ G06K 9/38 382/173 |
| 2012/0168001 | A1 | 7/2012 | Zhang |
| 2012/0225719 | A1 | 9/2012 | Nowozin |
| 2012/0309532 | A1 | 12/2012 | Ambrus |
| 2013/0107010 | A1 | 5/2013 | Hoiem |
| 2013/0208900 | A1 * | 8/2013 | Vincent .................. H04S 7/303 381/17 |
| 2013/0322762 | A1 | 12/2013 | Zeng |
| 2013/0336524 | A1 | 12/2013 | Zhang |
| 2014/0118335 | A1 | 5/2014 | Gurman |
| 2014/0204013 | A1 | 7/2014 | OPrey |
| 2014/0232631 | A1 | 8/2014 | Fleischmann |
| 2014/0375782 | A1 | 12/2014 | Chichilnisky |
| 2015/0117708 | A1 | 4/2015 | Guigues |
| 2015/0261992 | A1 | 9/2015 | Bebis |
| 2015/0324692 | A1 | 11/2015 | Ritchey |
| 2016/0026253 | A1 * | 1/2016 | Bradski ................ G02B 27/225 345/8 |
| 2016/0171340 | A1 | 6/2016 | Fleishman |
| 2016/0277863 | A1 * | 9/2016 | Cahill .................... H04R 3/005 |
| 2016/0307032 | A1 | 10/2016 | Butler |

OTHER PUBLICATIONS

Vieriu, et al., "Background Invariant Static Hand Gesture Recognition based on Hidden Markov Models," International Symposium on Signals, Circuits and Systems (ISSCS), Trento, Italy, Jul. 11-12, 2013.

* cited by examiner

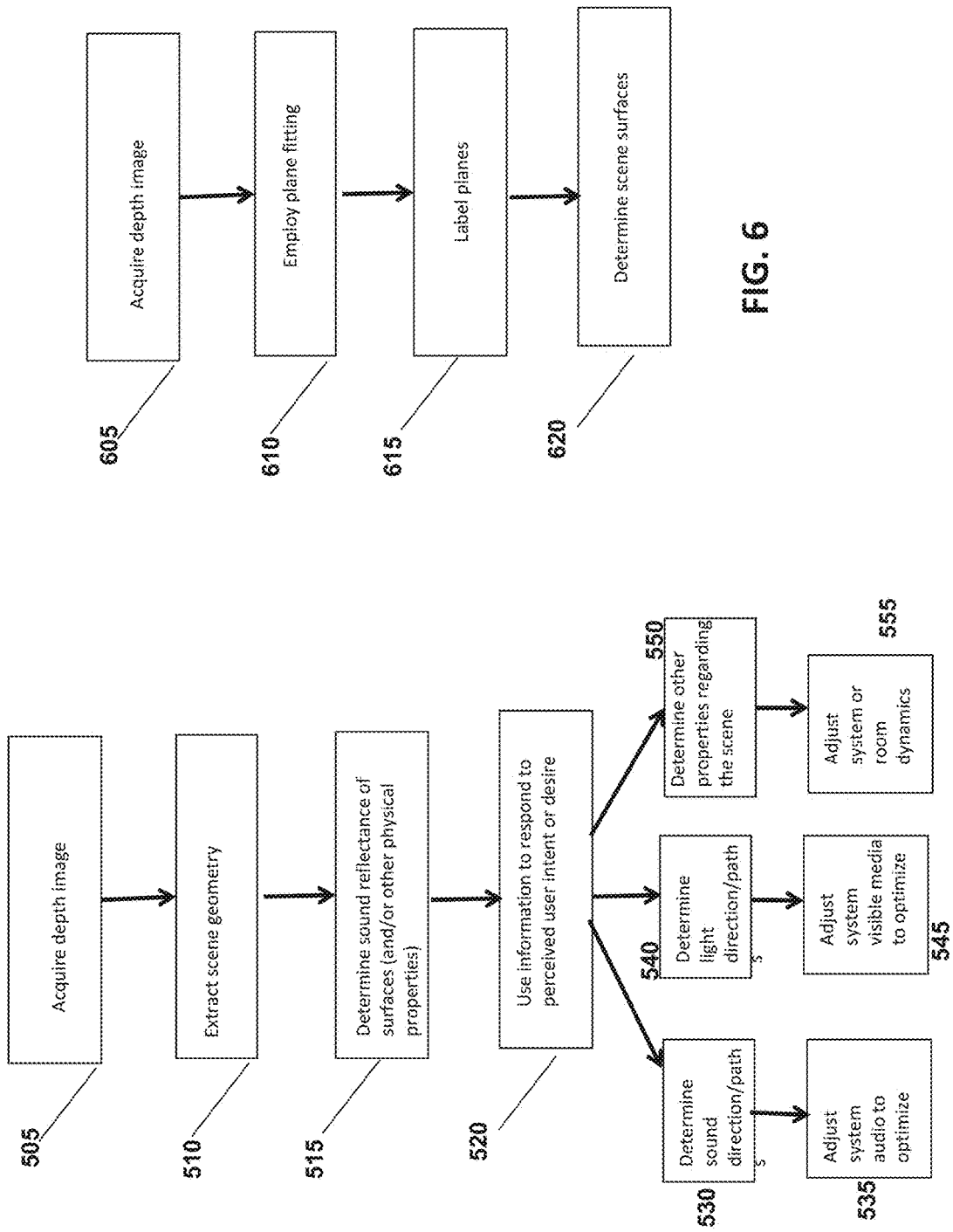

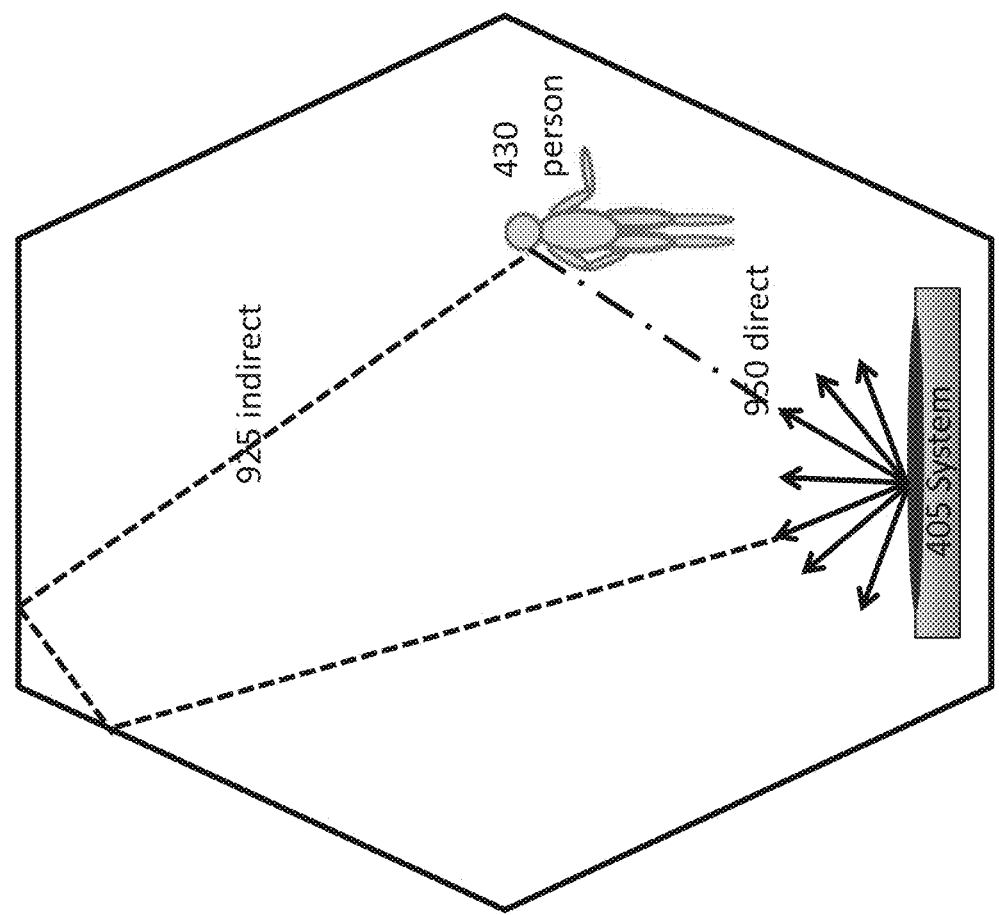
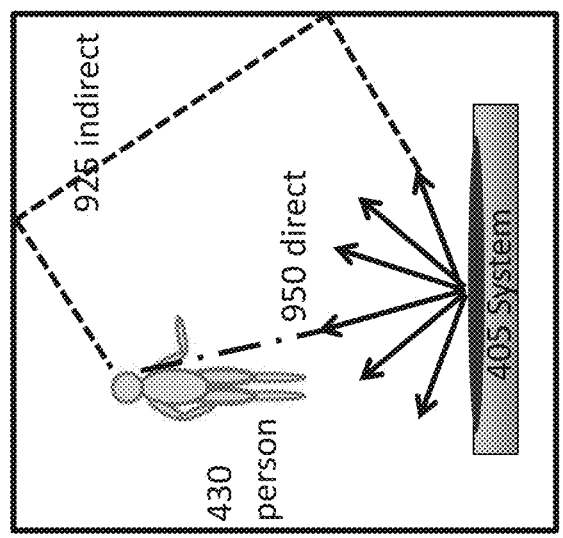

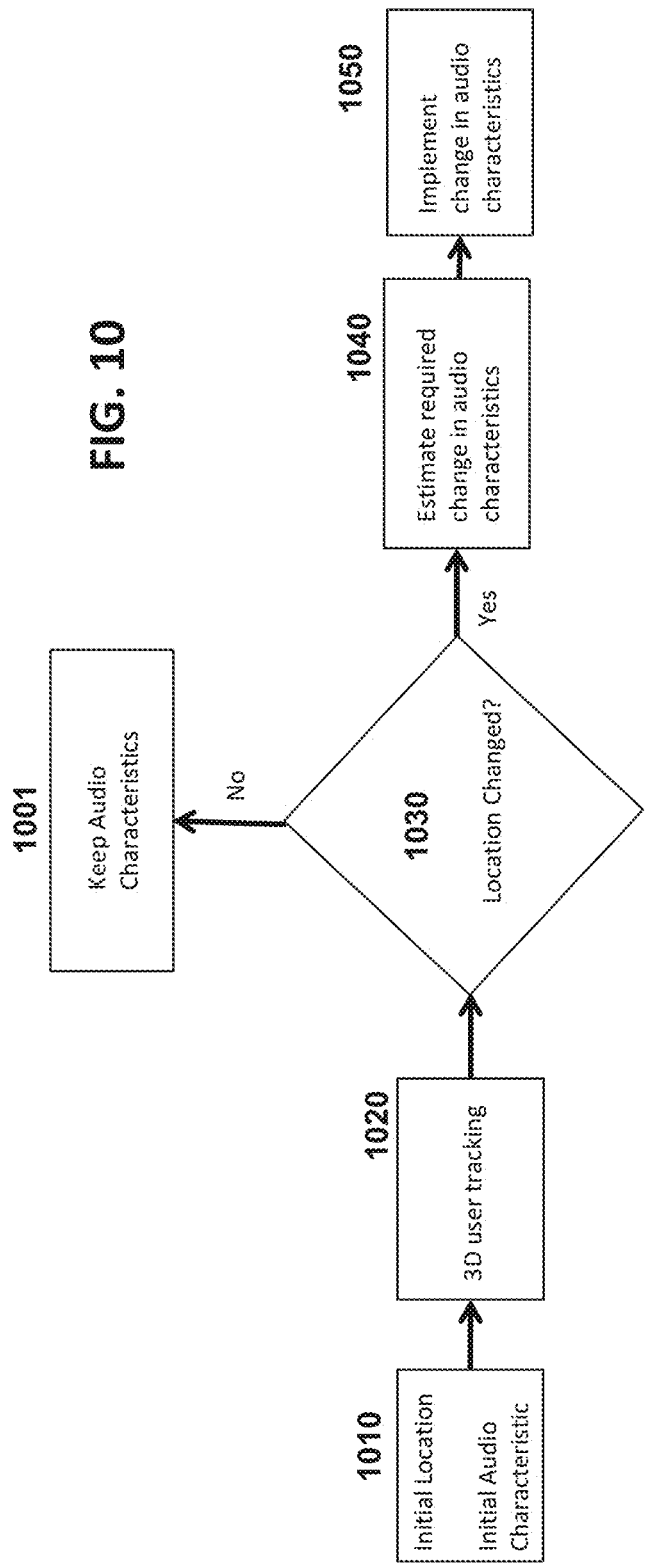

MULTI MEDIA COMPUTING OR ENTERTAINMENT SYSTEM FOR RESPONDING TO USER PRESENCE AND ACTIVITY

BACKGROUND

Traditional user interfaces for computers and multi-media systems are not ideal for a number of applications and are not sufficiently intuitive for many other applications. In a professional context, providing stand-up presentations or other types of visual presentations to large audiences is one example where controls are less than ideal and, in the opinion of many users, insufficiently intuitive. In a personal context, gaming control and content viewing/listening are but two of many examples. In the context of an audio/visual presentation, the manipulation of the presentation is generally upon the direction of a presenter that controls an intelligent device (e.g. a computer) through use of remote control devices. Similarly, gaming and content viewing/listening also generally rely upon remote control devices. These devices often suffer from inconsistent and imprecise operation or require the cooperation of another individual, as in the case of a common presentation. Some devices, for example in gaming control, use a fixed location tracking device (e.g., a trackball or joy-stick), a hand cover (aka, glove), or body-worn/held devices having incorporated motion sensors such as accelerometers. Traditional user interfaces including multiple devices such as keyboards, touch/pads/screens, pointing devices (e.g. mice, joysticks, and rollers), require both logistical allocation and a degree of skill and precision, but can often more accurately reflect a user's expressed or implied desires. The equivalent ability to reflect user desires is more difficult to implement with a remote control system.

When a system has an understanding of its users and the physical environment surrounding the user, the system can better approximate and fulfill user desires, whether expressed literally or impliedly. For example, a system that approximates the scene of the user and monitors the user activity can better infer the user's desires for particular system activities. In addition, a system that understands context can better interpret express communication from the user such as communication conveyed through gestures. As an example, gestures have the potential to overcome the aforementioned drawbacks regarding user interface through conventional remote controls. Gestures have been studied as a promising technology for man-machine communication. Various methods have been proposed to locate and track body parts (e.g., hands and arms) including markers, colors, and gloves. Current gesture recognition systems often fail to distinguish between various portions of the human hand and its fingers. Many easy-to-learn gestures for controlling various systems can be distinguished and utilized based on specific arrangements of fingers. However, current techniques fail to consistently detect the portions of fingers that can be used to differentiate gestures, such as their presence, location and/or orientation by digit.

SUMMARY

Varying embodiments of the invention illustrate the use of an intelligent system that responds to user intent and desires based upon activity that may or may not be expressly directed at the system. In some embodiments of the invention, the intelligent system acquires a depth image of a scene surrounding the system. A scene geometry may be extracted from the depth image and elements of the scene, such as walls, furniture, and humans may be evaluated and monitored. In certain embodiments, user activity in the scene is monitored and analyzed to infer user desires or intent with respect to the system. For example, if the user is observed leaving the room, the output of the intelligent system may be paused. In addition, the scene geometry may be a factor in the system's response. As an example, if a user enters a portion of the scene with low acoustic reflectance, the audio volume of the system output may be increased to compensate for the relatively decreased acoustic reflection being experienced by the user.

In other embodiments, the intelligent system may determine that the user is attempting to engage the system to provide express instructions. If express instructions are interpreted, some embodiments contemplate slavishly following the express instruction, and other embodiments contemplate generally following the instructions, while, however, compensating based upon scene geometry. For example, if user is detected as older in age and that user expressly requests a higher volume, the system may decide that the user requires better differentiation of voice dialog in the system output. Therefore, the system may change the relative spectral distribution of the system output (to relatively amplify voice) rather than increase the average volume.

In one embodiment the disclosed concepts provide a method to identify fine hand gestures based on real-time three-dimensional (3D) sensor data. The method includes receiving a first depth map of a region of space, the first depth map having a first plurality of values, each value indicative of a distance. In one embodiment the depth map may represent only a portion of the region of space. In another embodiment the depth map may represent only a slice—small portion—of the region of space. A candidate hand in the first depth map may be identified based on the first plurality of values. The candidate hand may be tested against one or more criteria (e.g., size, aspect ratio, and how it connects to other areas in the region of space) and, should the testing so indicate, a hand may be identified. For example, in one embodiment, a hand may be connected to a larger area (e.g., an arm, shoulder, or torso) along only one axis or side with all other sides being free or disconnected. A feature vector may be determined by first identifying a 3D region of space encompassing the identified hand, partitioning this region into a plurality of sub-regions, and fixing a value for each of the sub-regions. A combination of each sub-region's value may be assembled to generate the feature vector (e.g., concatenation). The feature vector may be applied to a classifier to identify one of a predetermined number of gestures. In one embodiment the classifier may include a random forest classifier and a plurality of support vector machine classifiers (SVM), one for each of the predetermined gestures. In practice, a detected hand's feature vector may be applied to the random forest classifier to generate an estimated gesture descriptor which can then be applied to the SVMs. Output from the SVMs represent the detected gesture (or indicate that no gesture was detected). The detected gesture may be used to cause an action such as, for example, to adjust an operational parameter of an executing application, a computer system, or a control system. In some embodiments, a second depth map may be received immediately after the first depth map, wherein the first and second depth maps partially overlap.

In other embodiments, the 3D region of space encompassing the identified hand may be partitioned into sub-regions uniformly or non-uniformly along each axis (e.g., x, y and z). In still other embodiments the disclosed methods may be used to identify other predetermined objects other than hand gestures, such as, for example, faces, whole bodies, other types of animate objects (e.g., horses and pets), or inanimate objects (e.g., geometrical shapes). In yet another embodiment, the disclosed methods may be used to detect multiple hands in a single scene. In still other embodiments, the disclosed methods may be implemented as hardware, software or a combination thereof. Software to implement any of the disclosed methods may be stored in non-transitory memory such as, for example, a magnetic hard disk.

BRIEF DESCRIPTION OF THE DRAWINGS

FIG. 5 shows an illustrative process for detecting and responding to user intent or desire.

FIG. 6 shows an illustrative process for evaluating scene geometry.

FIGS. 9a and 9b show sample audio paths.

FIG. 10 shows an example process for responding to user activity.

DETAILED DESCRIPTION

Figure 1:
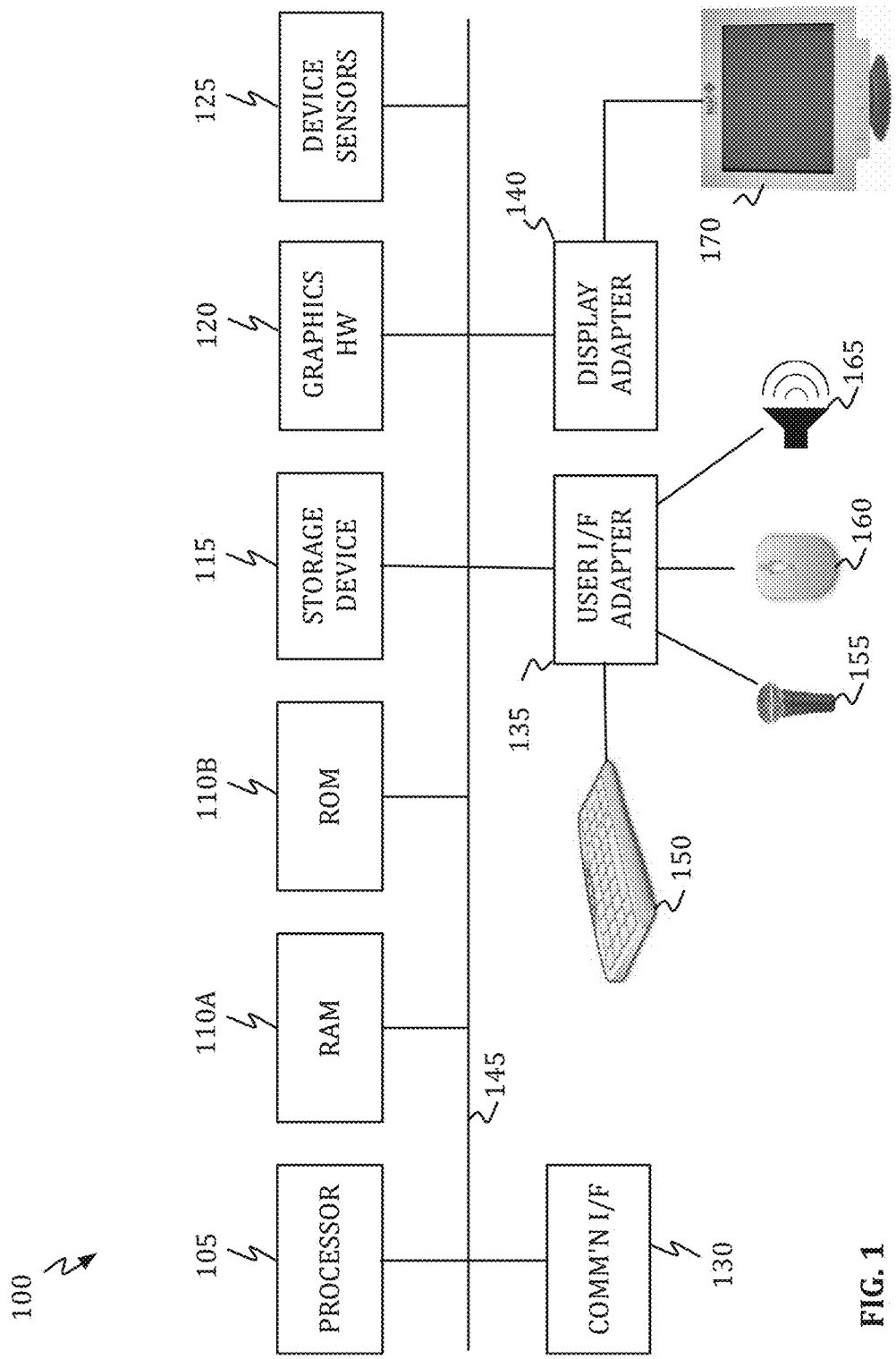
FIG. 1 shows an illustrative configuration of an intelligent system.

This disclosure pertains to systems, methods, and computer readable media to improve the operation of user interfaces including scene interpretation, user activity, and gesture recognition. In general, techniques are disclosed for interpreting the intent or desire of one or more users and responding to the perceived user desires, whether express or implied. Many embodiments of the invention employ one or more sensors used to interpret the scene and user activity. Some example sensors may be a depth sensor, an RGB sensor and even ordinary microphones or a camera with accompanying light sensors.

Varying embodiments of the invention may use one or more sensors to detect the user's scene. For example, if the system serves as a living room entertainment system, the scene may be the user's living room as well as adjacent areas that are visible to the sensors. The scene may also be as small as the space in front of a user's workstation, the interior of a car, or even a small area adjacent to a user's smart phone or other portable device (to interpret user desires with respect to that device). The scene may additionally be large, for example, including an auditorium, outdoor area, a playing field, or even a stadium. In sum, the scene may be any area where there is a value for intelligent systems such as computers or entertainment systems to interpret user intent or desire for system activity.

In some embodiments, the system may also sense and interpret user activity, such as the posture, position, facial expressions, and gestures of the user. The information may be used to alter the state of the system (e.g. computer or entertainment system) to better suit the user(s). Many embodiments of the invention allow for direct user manipulation of the system either to operate system settings or to control an application of the system such as games, volume, tuning, composing, or any manipulations that a user might expressly desire from the system in use.

In the case of express communication with a system, some embodiments contemplate the identification of fine hand gestures based on real-time depth information obtained from, for example, optical- or non-optical-type depth sensors. More particularly, techniques disclosed herein may analyze depth information in "slices" (three-dimensional regions of space having a relatively small depth) until one or more candidate hand structures are detected. At the time of this writing, some examples of devices having this type of depth sensing capability are made by LinX Imaging. Once detected, each candidate hand structure may be confirmed or rejected based on its own unique physical properties (e.g., shape, size and continuity to an arm structure). Each confirmed hand structure may be submitted to a depth-aware filtering process before its own unique three-dimensional features are quantified into a feature vector. A two-step classification scheme may be applied to the feature vectors to identify a candidate gesture (step 1), and rejects candidate gestures that do not meet a gesture-specific identification operation (step-2). In still other embodiments the disclosed methods may be used to identify/detect three-dimensional objects other than hands (e.g. such as other body parts or items).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter or resort to the claims being necessary to determine such inventive subject matter. Reference in this disclosure to "one embodiment" or to "an embodiment" or "embodiments" means that a particular feature, structure, or characteristic described in connection with the embodiment is included in at least one embodiment of the disclosed subject matter, and multiple references to "'one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of user interface and response systems and/or gesture identification processing systems.

Exemplary Hardware and Software

The inventive embodiments described herein may have implication and use in and with respect to all types of devices, including single and multi-processor computing systems and vertical devices (e.g. cameras, gaming systems, or appliances) that incorporate single- or multi-processing computing systems. The discussion herein references a common computing configuration having a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a server, a laptop, a tablet, a desktop computer, a gaming platform (whether or not portable), a television, an entertainment system, a smart phone, a phone, or any other computing device, whether mobile or stationary.

Referring to FIG. 1, the disclosed embodiments may be performed by representative computer system 100 including a 3D image sensor system such as 1405 and/or other sensors 125. For example the representative computer system may be embodied in any type of device such as a general purpose computer system, a television, a set top box, a media player, a multi-media entertainment system, an image processing workstation, or a hand-held device. Any such device may be coupled with or may incorporate a 3D depth sensor and/or other sensors as discussed herein. Computer system 100 may include one or more processors 105, memory 110 (110A and 110B), one or more storage devices 115, and graphics hardware 120. Computer system 100 may also have device sensors 125, which may include one or more of: depth sensors (such as a depth camera); 3D depth sensor(s); imaging devices (such as a fixed and/or video-capable image capture unit); RGB sensors; proximity sensors; ambient light sensors; accelerometers; gyroscopes; any type of still or video camera; LIDAR devices; SONAR devices; microphones, CCDs (or other image sensors), infrared sensors, thermometers, etc. These and other sensors may work in combination with one or more GPUs, DSPs or conventional microprocessors along with appropriate programming so that the sensor outputs may be properly interpreted and/or combined to contribute to the interpretation a scene and user activity within the scene.

Returning to FIG. 1, system 100 may also include communication interface 130, user interface adapter 135, and display adapter 140—all of which may be coupled via system bus or backplane 145. Memory 110 may include one or more different types of media (typically solid-state) used by processor 105 and graphics hardware 120. For example, memory 110 may include memory cache, read-only memory (ROM), and/or random access memory (RAM). Storage 115 may include one more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120 such computer program code may implement one or more of the methods or processes described herein. Communication interface 130 may include semiconductor-based circuits and be used to connect computer system 100 to one or more networks. Illustrative networks include, but are not limited to: a local network, such as a USB network; a business' local area network; or a wide area network such as the Internet and may use any suitable technology (e.g., wired or wireless). Communications technologies that may be implemented include cell based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170.

Processor 105 may execute instructions necessary to carry out or control the operation of many functions performed by system 100 (e.g., such as detection and/or identification scene geometry and user activity including hand gestures, all in accordance with this disclosure). Processor 105 may, for instance, drive display 170 and receive user input from user interface adaptor 135 or any other user interfaces embodied by a system. User interface 135, for example, can take a variety of forms, such as a button, a keypad, a dial, a click wheel, a keyboard, a display screen, and/or a touch screen. Processor 105 may be any type of computing device such as one or more microprocessors working alone or in combination with GPUs, DSPs, system-on-chip devices such as those found in mobile devices. Processor 105 may include one or more dedicated graphics processing units (GPUs). In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In one embodiment, graphics hardware 120 may include one or more programmable graphics processing units (GPUs). System 100 (implementing one or more embodiments discussed herein) can provide the means for one or more users to control the same system (e.g., system 100) or another system (e.g., another computer or entertainment system) through user activity, which may include natural activity and/or predetermined gestures such as hand gestures. In this manner, sensors such as 3D image sensor system 1405 may function as another aspect of user interface adapter 135. Further, in some embodiments, sensors such as a 3D image sensor system may be implemented as separate plug-ins to system 100 (e.g., as embodied in software stored on a secure digital (SD) card that uses the system 100's native image and/or video capture capability).

As discussed, various embodiments of the invention may employ sensors, such as cameras. Cameras and like sensor systems may include auto-focus systems to accurately capture video or image data ultimately used interpret user intent or commands. Since the motion of the user may be based upon subtle activity in small regions in the captured images (e.g. hands, fingers, face, mouth, brow etc.) the autofocus system may be used to separately focus on multiple regions of the image in order to access better information. For example, in order to accurately ascertain gesture commands, the autofocus system may focus only on one or more hand or finger areas of a user or other visible person. In another example the auto-focus system may concentrate on facial expression, so it could be employed to separately focus on the lips (or a portion thereof), the eyes (or a portion thereof), the chin, the forehead, or any other feature useful in ascertaining user desire or intent. Similar to autofocus, changes in depth of field (e.g. through aperture adjustment) may also effectively capture subjects at differing depths.

Returning to FIG. 1, sensors 125 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis. If the time is 3:00 a.m., it is more likely that a user's face indicates sleepiness than sadness.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or in any storage accessible on an attached network. Memory 110 may include one or more different types of media used by processor 105, graphics hardware 120, and sensors 125 to perform device functions. Storage 115 may store data such as media (e.g., audio, image, and video files), metadata for media, computer program instructions, or other software including database applications (e.g., a database storing avatar frames as discussed below), preference information, device profile information, and any other suitable data. Memory 110 and storage 115 may be used to retain computer program instructions or code organized into one or more modules in either compiled form or written in any desired computer programming language. When executed by, for example, processor 105, such computer program code may implement one or more of the acts or functions described herein (e.g., interpreting and responding to user activity including commands and/or gestures).

Figure 2:
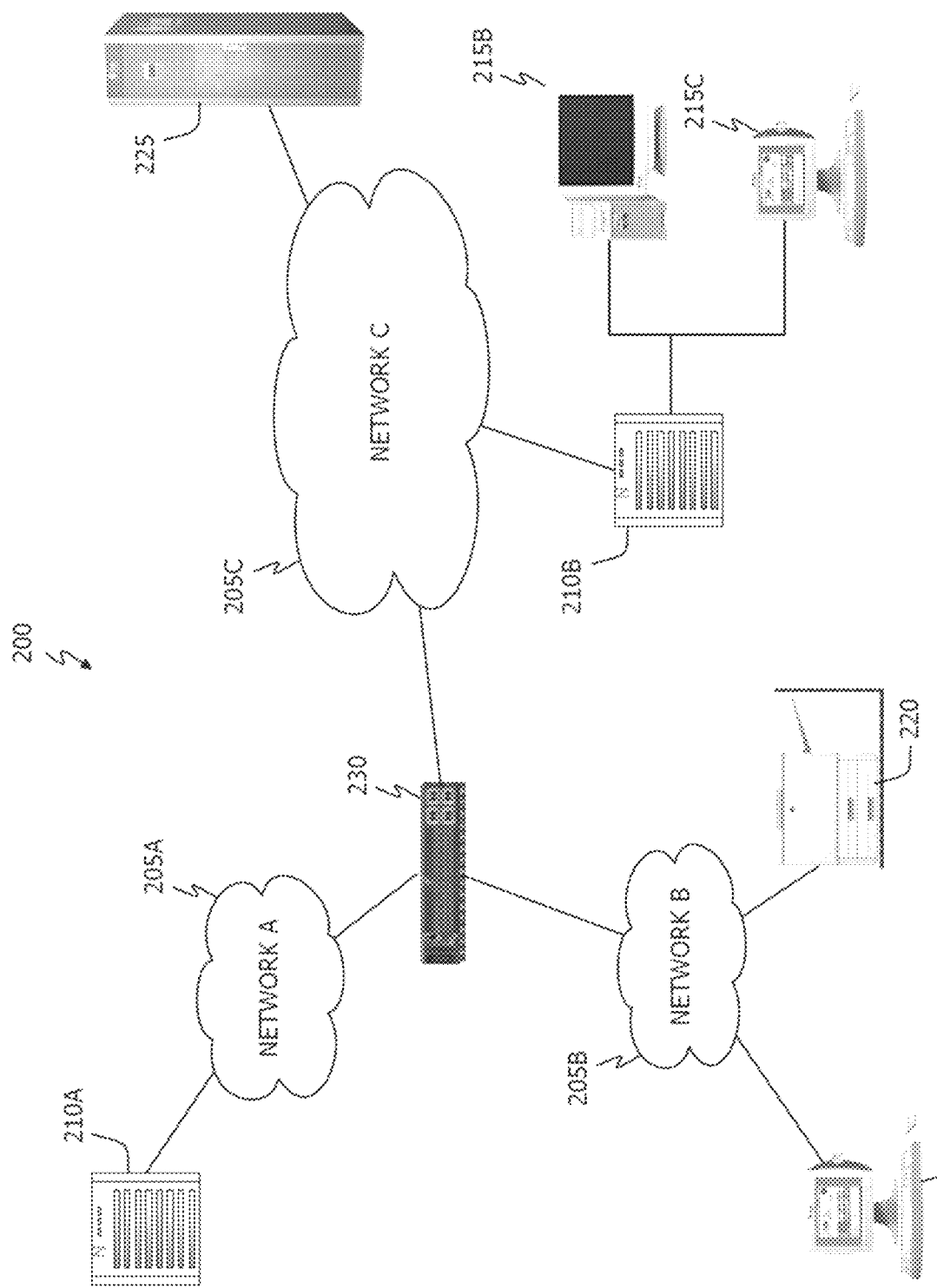
FIG. 2 shows an illustrative network configuration.

Referring now to FIG. 2, illustrative network architecture 200, within which the disclosed techniques may be implemented, includes a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to receive information regarding scene geometry or user activities and to process that information partially or entirely on the server before returning it to the local system (e.g., computer or entertainment system) to implement a response to the user(s).

Client computers 215 (i.e., 215A, 215B and 215C), which may take the form of any smartphone, gaming system, tablet, computer, set top box, entertainment device/system, television, communications device, or intelligent machine, including embedded systems, may also be coupled to networks 205, and/or data server computers 210. In some embodiments, network architecture 210 may also include network printers such as printer 220 and storage systems such as 225, which may be used to store multi-media items or other data that are referenced herein. To facilitate communication between different network devices (e.g., data servers 210, end-user computers 215, network printer 220, and storage system 225), at least one gateway or router 230 may be optionally coupled there-between. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including PANs, LANs, WANs, and cellular networks).

As noted above, embodiments of the inventions disclosed herein include software. As such, a general description of common computing software architecture is provided as expressed in layer diagrams of FIG. 3. Like the hardware examples, the software architecture discussed here is not intended to be exclusive in any way but rather illustrative. This is especially true for layer-type diagrams, which software developers tend to express in somewhat differing ways. In this case, the description begins with layers starting with the O/S kernel, so lower-level software and firmware has been omitted from the illustration but not from the intended embodiments. The notation employed here is generally intended to imply that software elements shown in a layer use resources from the layers below and provide services to layers above. However, in practice, all components of a particular software element may not behave entirely in that manner.

Figure 3:
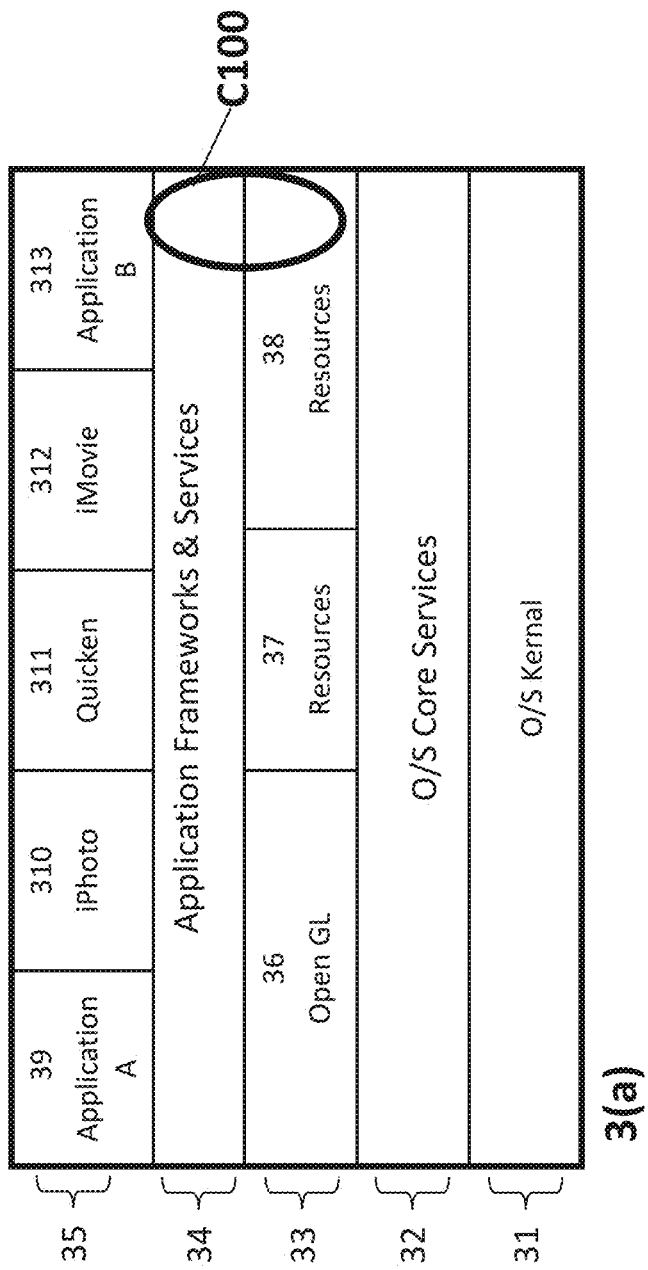
FIG. 3 shows an illustrative software architecture.

With those caveats regarding software, referring to FIG. 3, layer 31 is the O/S kernel, which provides core O/S functions in a protected environment. Above the O/S kernel is layer 32 O/S core services, which extends functional services to the layers above, such as disk and communications access. Layer 33 is inserted to show the general relative positioning of the Open GL library and similar application and framework resources. Layer 34 is an amalgamation of functions typically expressed as multiple layers: applications, frameworks, and application services. For purposes of our discussion, these layers provide high-level and often functional support for application programs which reside in the highest layer shown here as item 35. Item C100 is intended to show the general relative positioning of the frameworks and low-level software discussed with respect to embodiments herein. In particular, in some embodiments, frameworks and low-level software may provide an application program with assistance interpreting a scene; user activity, including gestures and facial expressions; and responding to the user activity. While the ingenuity of any particular software developer might place the functions of the software described at any place in the software stack, the software hereinafter described is generally envisioned as all of: (i) user-facing application software, for example, to present a user interface to an application user (e.g. in the context of a setup or a game); (ii) as a utility, or set of functions or utilities, beneath the application layer, supporting the interpretation of scene information or user activity; and (iii) as one or more server applications for aiding in communications, processing, and interpretation of user activity as well as responding to those interpretations. Furthermore, on the server side, certain embodiments described herein may be implemented using a combination of server application level software, database software, with either possibly including frameworks, and a variety of resource modules.

In the application layer 35 of the software stack shown in FIG. 3, there are shown a variety of software applications such as gaming application 39, iPhoto 310 (Photo organizing and editing software), Quicken 311 (financial organization software), iMovie 312 (video organizing and editing software) and other applications 313. Other applications 313 may include any type of software, such as a social networking application, an Internet browser application, or any of the titles currently distributed through Apple's App store for Mac or iOS.

No limitation is intended by these hardware and software descriptions and the varying embodiments of the inventions herein may include any manner of computing devices such as Macs, PCs, PDAs, phones, servers, or even embedded systems.

Scene Geometry

Figure 4B:
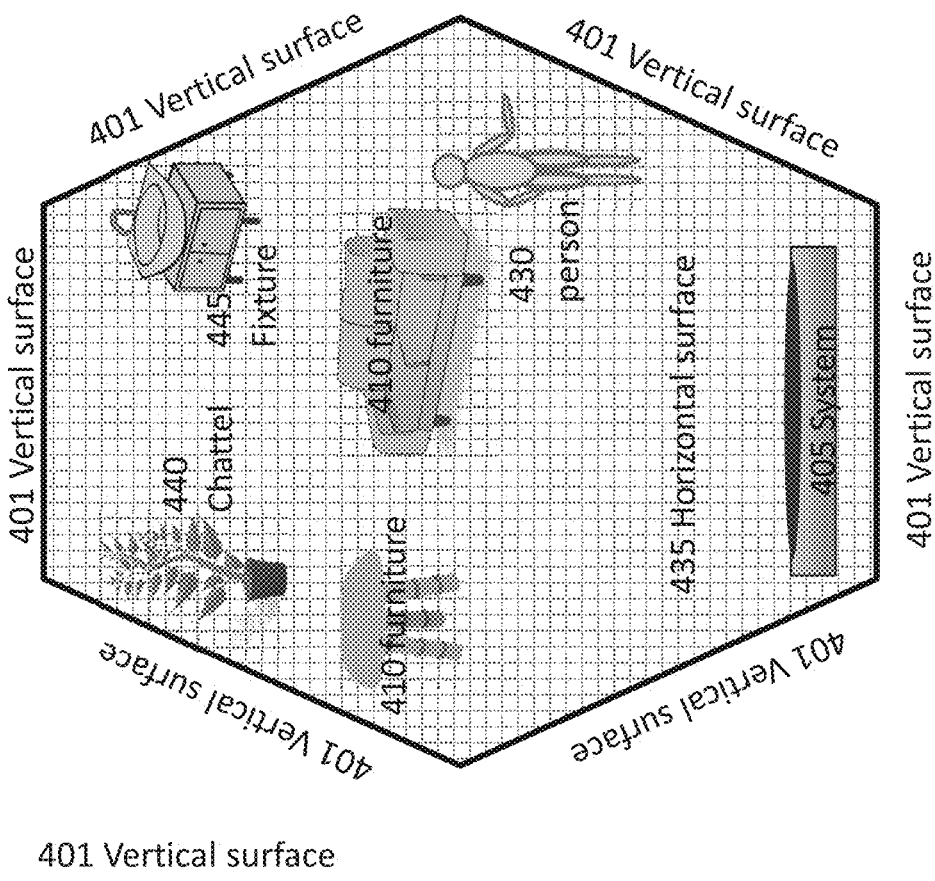
FIGS. 4a and 4b show illustrative scene configurations.
Figure 4A:
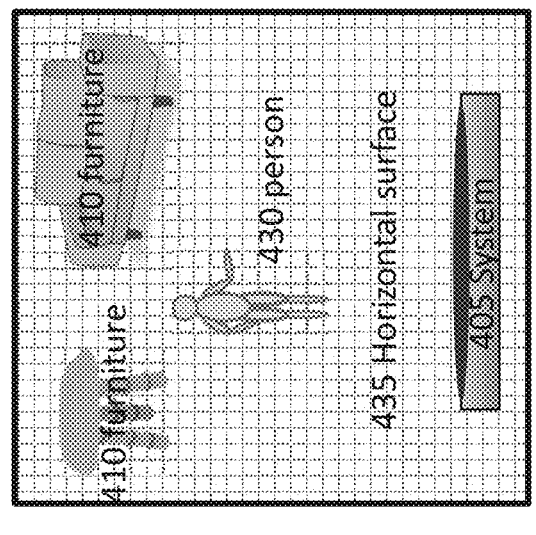

Referring to FIGS. 4*a* and 4*b*, some embodiments contemplate detection of the scene geometry by the system 405 or devices and equipment in cooperation with the system 405. One or more sensors may be employed to detect the scene geometry, which generally refers to the structure of the room in two or three dimensions. For example, one type of scene geometry contemplated for embodiments of the invention involves determining or estimating the location and/or nature of each element in a space visually or acoustically exposed to the system 405 (e.g. a multi-media entertainment center or computer system). Thus, varying embodiments of the invention may determine or estimate the two- or three-dimensional position of vertical surfaces 410, such as walls; horizontal surfaces 435, such as floors; furniture 410 or other chattel 440; fixtures 445; as well as living things, such as pets or humans 430. By understanding scene geometry, the system 405 may provide a better experience for the user.

As discussed above, some embodiments employ one or more sensors to recover scene geometry. One type of sensor that may be used is a depth camera, which may serve as a type of depth sensor (e.g. cameras provided by LinX Imaging). At the time of this disclosure, some depth cameras provide multiple sensing modalities such as depth detection and infrared reflectance. Depth detection recovers the existence of objects or portions of objects as well as the distance of the objects from the sensor. Thus, for example, referring to FIG. 4*a*, a depth detection of the scene taken from a sensor in the system 405 should recover data representing the approximate dimension and location of: the three vertical surfaces 401 (walls) in front of the system; the horizontal surface(s) 435 (floor); the person 430; and separate parts of the furniture 410 (because varying parts of the furniture have different depths).

In addition to depth detection, some contemporary depth cameras also detect infrared reflectance. Information regarding infrared reflectance of an object reveals properties of the object including information about color. Information detected regarding infrared reflectance can be used with the depth information to aid in identifying objects in the room or potentially determining how those objects affect the use of the system in the scene (e.g., the effects on a user's perception of light and sound).

In some embodiments of the invention, other sensors may be used to detect scene geometry. For example, in addition to a depth camera as discussed above, system 405 may employ one or more of the following sensors: other depth sensors; imaging devices (such as a fixed and/or video-capable image capture unit); RGB sensors; proximity sensors; ambient light sensors; remote or local accelerometers; remote or local gyroscopes; LIDAR devices; SONAR devices; microphones; CCDs (or other image sensors); other infrared sensors (e.g., FLIR-type devices); other thermal sensors (e.g., thermometers), etc. The output of one or more of these sensors may be processed through DSP(s) and/or conventional microprocessors in order to recover sufficiently accurate scene geometry to aid in the interface with system 405.

Whether a depth camera is used alone or in combination with other sensors, some embodiments use the sensor data to build a 3D model of the room. The 3D model may contain as much useful information as the sensors' data will allow. The model may be used to: optimize audio performance in a room; direct video or other media; help interpret user activity and intent/desire; control room conditions, such as lighting, shading, or temperature; or, perform any actions that best approximate the user's intent or desire.

Referring now to FIG. 5, a process is shown for acquiring and using scene geometry. At 505, one or more sensors are used to acquire depth information as discussed above, potentially including a depth image. At 510, three-dimensional scene geometry (e.g., a 3D model) may be extracted or derived from the depth image. At 515, after obtaining a version of the scene geometry, the sound reflectance of each surface may be calculated or estimated. While some embodiments of the invention contemplate exchanging the timing of 510 and 515, at least one embodiment requires 515 after 510 because the scene geometry may be used to help estimate or determine sound reflectance. In embodiments using only the depth camera, sound reflectance may be estimated using two or more of the positioning of a surface, the color or tone of the surface, the shape of the surface, the size of the surface and the IR reflectance of the surface. For example, if the scene geometry reveals a wall in a certain location, an acoustic reflectance may be assumed for sheet rock. Alternatively, the color and IR reflectance of the wall may alter the assumption regarding acoustic reflectance. Similarly, if the scene geometry finds furniture in a location, the acoustic reflectance may be assumed for upholstery or leather and the assumption may be refined with further sensor data. Some embodiments of the invention may employ other sensors for determining acoustic reflectance. For example cameras, LIDAR, and similar technologies may be used to better estimate sound reflectance. In some embodiments, a table, database, or equivalent structure may be constructed and stored to correlate sensor output information and other data with various assumptions regarding sound reflectance. For example, a table may correlate the detected volume of the room combined with sensed information regarding individuals or surfaces in the room with reflectance or reverberation of the room or any portion thereof.

As indicated at 515, the invention contemplates determination of acoustic properties as well as other physical properties. In this respect, the system may use sensor data to determine visual properties of the room such as light paths from the system 405, the existence, location and luminance state of windows and lights, and the state of any other controllable items in the scene (e.g. shading, lighting, temperature, communications devices, doors, appliances, etc.).

At 520, the detected and derived information is used to respond to perceived intent or desire of the users. FIG. 5 shows three potential paths for fulfilling 520 and the invention contemplates other variations. One potential path for responding to user desire or intent is shown in 530 and 535, where the directional paths of audio are determined 530 and then used to adjust or optimize the system 535. For example, the system's audio element (e.g., speaker) location may be known to the system and the scene and depth information may be used along with sound reflectance information to determine the various paths of system-created-sound through the room. As a physical property of acoustics, the transmissibility of the paths will vary with frequency of the audio. Having all this information allows the system to adjust volume or spectral balance of each acoustic element in order to best suit users in the scene. In addition, the system may also re-direct different spectral elements of the audio to compensate for the transmissibility of various audio paths and ultimately better serve the user.

The path defined by 540 and 545 illustrates an example of system response based upon light. In particular, the light paths may be determined at 540 and the system may be adjusted accordingly at 545. For example, the system may be able to tilt its monitor or alter its visible content to accommodate the positioning of users. This may be particularly useful where visual effects such as 3D imaging are involved.

The path defined by 550 and 555 illustrates the intended flexibility of the invention. The scene information and other physical properties may be used to analyze any property of the scene (i.e., relating to system activity) 550 and adjust the system or room dynamics in response 555. For example, the system may make backlighting or glare determinations with respect to a user and may automatically lower shading or turn up brightness in response.

Referring now to FIG. 6, a process is shown for using a depth image (i.e., the output of a depth camera) in order aid in development of a scene model. At 605, a depth image acquired through the use of a depth camera or other sensor device. At 610, a plane fitting process employed to extract the planes from the depth image. For example, the depth image may expose a group of pixels, which can be sorted according to sets of pixels that lie in the same plane (i.e., plane fitting). The particular geometry of a plane may be estimated by computing and using the normal to each plane. This reveals the horizontal (e.g., floors) or vertical (e.g., walls) nature of each plane. At 615, the planes are labeled. For example, each plane may be associated in a table, database, or other memory structure with defining information about the plane. At 620, the surfaces are identified with the items in a scene geometry (e.g., a wall, a floor, furniture, etc.). Depending upon the ability of the sensor(s) and/or the sophistication of the software, any level of detail may be determined and stored regarding each scene surface. In a simpler embodiment, the determination might be limited to the nature of the item—a wall, a floor, furniture. In a more sophisticated embodiment, the determination may attempt to characterize more detailed characteristics such as a furniture leg, a lamp, a pillow, etc.

In some embodiments of the invention, depth image information is used to determine acoustic reflection by estimating the bumpiness of each surface. One way to estimate bumpiness is to construct a histogram that categorizes each pixel of a plane according to the extent of its difference from adjacent pixels. The bumpiness of the plane is indicated by the entropy of the histogram—more entropy means bumpier. Furthermore, in some embodiments, bumpier surfaces may be treated as less acoustically reflective.

User Activity

Figure 7:
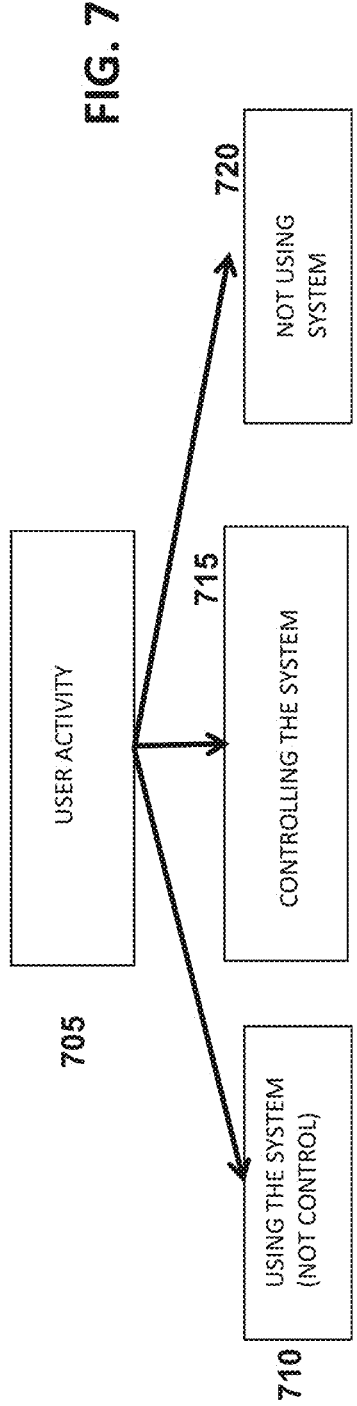
FIG. 7 illustrates example conceptions regarding user activity.

Many embodiments of the invention contemplate detection and analysis of user activity in order to fashion system responses that a user expects, intends, or desires. Referring to FIG. 7, user activity 705 may be generally characterized in three ways. With reference to 710, some user activity relates to the substantive use of the system. For example, substantive uses of a system are watching a TV system, playing a game on a computer/gaming system, or communicating (e.g., a video call) through a computer/communications system. For purposes of the example of FIG. 7, using the system 710 is distinguished from using the system to control system or application parameters 715. In the latter case, the user is attempting to communicate with the system to change a parameter of a system application (e.g., change users in a game or channels of a television), or the system itself (e.g., change system volume or turn off the system). As a final user activity category of FIG. 7, the user may be in the presence of the system but not using the system at all 720. An example of not using the system may occur if there is a conversation between two people who are not focused on the system output.

Figure 8:
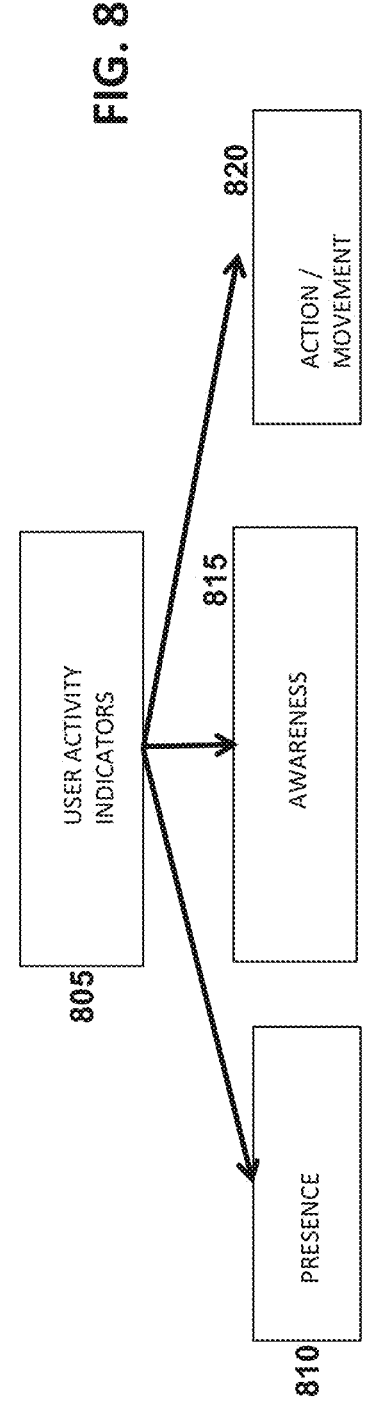
FIG. 8 illustrates example conceptions regarding user activity indicators.

Referring now to FIG. 8, a sample categorization of user activity indicators, which refers to detected information that indicates a particular user activity, is shown. One category of user activity indicators is presence 810, which concerns the presence of users in the scene. Varying embodiments of the invention contemplate one or more detected indicators of user presence: human presence; the number of humans present; human faces; the number of human faces; animal/dog/cat faces; the number of animal/dog/cat faces; age estimation of humans; gender estimation of humans; race estimation of humans, the position of each human; the position of each human relative to the scene geometry; the identity of humans; and the identity of animals/dogs/cats. Various techniques exist in the art for detecting these and other presence indicators and differing embodiments of the invention may use any techniques that are known now or in the future.

Some embodiments of the invention employ a memory regarding presence indicators. For example, the system may employ a database of presence indicators that aid in both future detection as well as responsive actions discussed below. In varying embodiments, the memory may retain information regarding each user as well as the behaviors and preferences of the user. The system may obtain the behavior and preference information by observation, by express user setting or by a combination of both. If sufficient identity information is available regarding a user, the system may also retrieve and obtain network-based information. For example, if the system detects the presence of John Smith, an online database (e.g., through the Internet) may provide other information about John Smith relating to aspects such as socio-economics, demographics, shopping preferences, career information, family information, etc.

Information regarding users can be very useful in determining user intent or desire. In some embodiments of the invention, the system attempts to make collective determinations regarding a group of simultaneous users. For example, if the system perceives a female adult, a male adult and one or more children, then the system may attempt to categorize the group as a family. In addition, contemporary face detection technology can reliably associate a face that is present in the scene to one that has been present before or one that is known via a setting or external information. Thus, regardless of the gender or age associations, if the system determines that the same group (or part of a group) of humans is frequently simultaneously present, the group may be a family and/or may be treated like a family. In any case or embodiment, more certain human identification allows the system to group users more accurately and respond to individual or group intents or desires.

Referring again to FIG. 8, the awareness activity factor is shown at 815. Awareness factors are indicators regarding the state of the user and how that state affects the user's ability to be aware of system activity or anything else occurring in the scene. One prominent example of awareness relates to whether a user is sleeping. A user's general dormancy as well as the user's state as awake or asleep may be assessed by sensors detecting head orientation, face, facial features (e.g. eyes open/shut and mouth open/shut), facial feature movement and timing (e.g. time eyes are open versus time eyes are shut). In addition to sleep-related factors, awareness factors may include any evidence of human inactivity and/or lethargy.

The final user activity indicator in the example of FIG. 8 relates to action or movement 820. Action or movement includes large actions such as: humans entering or exiting the scene; humans approaching or withdrawing from the system; or, loud and/or distinct noises (e.g., a tone or a command). In addition, action or movement also includes small actions such as: movement of facial features (e.g., eyelids, lips, lip corners, forehead, cheeks), hand activity; finger activity; non-specific sound; human voice; body position; body part position; and, visible or audible human gestures of any kind.

System Response

Varying embodiments of the invention employ detected user activity and/or the indicators of that activity in order to shape or alter system service. Audio service is one example of shaping or altering system service in response to user activity. A user's perception of audio varies based upon the user's physical position with respect to the audio source(s). Changes in a user's location with a scene may cause variations in perceived volume or in the perceived balance of spectral components that arrive at the user's ears. In the case of volume, there is a 6 dB drop in sound intensity (e.g., volume) for every doubling of distance from an audio source. Therefore, a user's distance from the audio source affects the volume of the sound that the user perceives. In addition, even in an open room, only a portion of the sound perceived by a user travels directly from the source to the user's ears. Referring to FIGS. 9a and 9b, simple examples of these concepts are shown. System 405 may radiate sound that travels both directly 950 and indirectly 925 to the user. Thus, by understanding scene geometry, the system may account for user location in adjusting both the spectral power distribution and the overall intensity of the audio. In some embodiments, the system's understanding of scene geometry extends to the acoustic reflectiveness of the various surfaces, and this capability enhances the system's potential to refine a responsive adjustment with respect to both volume and spectral balance.

In some embodiments, the system 405 may automatically adjust volume or sound intensity according to a user's position in the room. If the user becomes closer to an audio source, the intensity may be proportionally decreased. If the user moves further away from a source the intensity may be proportionally increased. The concept similarly applies to situations with multiple audio sources where each source may be altered accordingly or an overall average intensity (or other aggregating function) may be altered in response to user movements. In some embodiments with only one user in the scene the former arrangement may be preferred (i.e., volume of a source proportional to user distance), while in some embodiments with multiple users, the latter arrangement may be more desirable (i.e., average or aggregated volume proportional to average or aggregated distance).

In some embodiments of the invention, the location of one or more users is tracked by the system in two or three dimensions. The location of the user(s) may be detected on a periodic basis. The choice of a time period depends upon the particular applications, but, in order to create a user perception of real-time tracking, the period should be from a fraction of a second up to a few or several seconds.

Referring to FIG. 10 at 1010, the system 405 has initial characteristics 1010. The initial characteristics may include one or more audio characteristics, 2D or 3D location information for one or more users in the scene, or both. According to various embodiments, audio characteristics controlled by the system may include one or more of the following: average volume; volume per audio source; system spectral power distribution; spectral power distribution for each audio source; pointing direction of each audio source; and background noise suppression services. In addition to audio characteristics, various embodiments detect and/or store the following 2D or 3D location information: the location of a user or of multiple users in the scene; the motion of a user or of multiple users in the scene; and, the head orientation of one or more users. Using this type of location information, an embodiment of the invention may keep track of users' locations 1020. The tracking may be in real time so that the system may take responsive action in real time. In some embodiments, responsive system activity is reserved for periods of user inactivity in the scene (i.e., when users stop moving). In these latter embodiments the user movement tracking may lag real time to save power or other resources.

Referring again to FIG. 10, at 1030 a decision is made regarding whether the location of one or more users has changed. As suggested above, the decision may reflect real-time movements or may have a time lag to wait for movement to stop before deciding upon responsive action. In addition, depending upon the capability of the system and the particular media output of the system, there may be a threshold for movement that is considered a change by the system. For example, for in a system including only ordinary stereo media, minor movements of less than a few feet will have little effect on the user's perception of the audio. Alternatively, for a multi-track surround sound experience, closer tracking and response may be preferable.

If no change in position is detected (or changes are below a threshold), then the audio characteristics are unchanged 1001. If a sufficient positional change is detected, the system must determine the desirable change in audio characteristics 1040. In some embodiments, this determination is guided by a goal of providing the user with an unaltered experience regardless of the user's position in the scene (e.g., turn up the volume when the user(s) moves further away from the audio source(s)). In other embodiments, in response to user settings or learned observations regarding user behaviors, the system may adjust outputs according to pre-determined rules (e.g., when John leaves the room through the door on the right, he will be back within five minutes so pause the system; if John leaves through the back door, he will not return quickly, so enter power saving mode). After the determination is made, the changes are implemented by the system 1050. Furthermore, the scene may be periodically or continuously monitored so that adjustments may occur fluidly with user activity.

While the example of FIG. 10 is discussed in terms of audio, the same process may occur with respect to any useful output of the system. For example, in an equivalent system, adjustments to visible media may be made based upon user activity. In one embodiment employing a glassless 3D video experience, the visible media may be adjusted so that movements of the users' heads or bodies do not detract from the perception of 3D imagery.

In some embodiments of the invention, the system's monitoring and responsive action may involve physically re-staging the scene by physically moving (e.g., rotating) the audio or video sources. For example, the motorized controllers may rotate or tilt speakers and monitors in response to user movement. Alternatively, a similar result may be achieved by activating or deactivating audio and visible media sources in response to sensed user activity. For example, as the user retreats from the system, remote speakers nearer to the user may be activated.

In a similar fashion, varying embodiments of the invention contemplate adjustment of a variety of system outputs in response to detected user activity. The following table is provided for illustration:

TABLE 1

| Detected user activity | System response |
|---|---|
| User is openly engaged in a conversation (e.g., on the phone or not facing the system) | Turn down the volume in some embodiments. Pause the media in some embodiments. Enter power-saving mode in some embodiments. |
| User is whispering to another human/user. | Turn down the volume in some embodiments. Pause the media in some embodiments. Enter power-saving mode in some embodiments. Make no changes in some embodiments. |
| User is sleeping | Turn down the volume in some embodiments. Pause the media in some embodiments. Enter power-saving mode in some embodiments. |
| User leaves the scene | Pause the media in some embodiments. Enter power-saving mode in some embodiments. Power down the system in some embodiments. |
| User is communicating with the system | Pause the media in some embodiments. Pause the media, but do not pause for volume adjustments or media switching (e.g., channel changes) in some embodiments. |

With respect to some of the detected user activities discussed above, varying embodiments of the invention offer the following observations regarding detection of the activities or use of the detected information.

Sleep determinations. In determining if a user is sleeping, the eyes may be monitored. Eyes that are closed indicate that a user may be sleeping. In some embodiments, a determination regarding sleep/awake may be made based upon how long the eyes are closed after the last time the eyes were open. For example, some embodiments may employ a minimum threshold time that eyes must be closed for a user to be considered asleep. As an alternative or in addition, a sleep/wake determination may be based upon a ratio of eyes open time and eyes shut time over a period.

Pausing and powering down the system or media presentation. In some embodiments, if the system pauses, enters power-saving mode, or powers down, state information regarding the media presentation is preserved so that the user may be able to re-access the same experience that was in use prior to the pause or power down. State information may include audio and video settings, scene information (e.g., regarding the users present and their locations), and the location in the media where the presentation ceased. In some embodiments, when the user returns to the same media item, the state information may be re-used or offered to the user for re-use. Before restoring the system to a prior state, the state information may be altered to account for any time lag when the user may have lost attention. For example, a state may be preserved and reused for a time that is 10 seconds (or any chosen variable) prior to the detecting that the user left the room.

User communicating with the system. Many embodiments of the invention attempt to distinguish user activity that is directed toward the system, such as a user's attempt to control an application or work with system settings. Some embodiments use one or more sensors to detect when a user is attempting to communicate with the system. For example, a microphone or other audio sensor may be used to determine if the user is attempting to make voice contact with the system. The system may use voice analysis similar to that used in Apple's SIRI® intelligent assistant in order to understand user utterances and decipher those that are directed at the system. In some embodiments, the use of voice analysis may be constant so that all user voice is analyzed to determine context and/or to identify attempts to communicate with the system.

The use of voice analysis may be augmented by the use of other sensors. A depth camera, a LIDAR, an RGB sensor, or ordinary camera images may be used to analyze user body movements in order to determine when a user's utterances are most likely directed at the system. In one embodiment, the depth sensor or one or more other sensors may be employed to determine if a person is speaking in a direction or manner suggesting that the person is addressing the system. Below there is provided an example embodiment of this type for determining if a user is engaged with the system Rather than constantly performing voice analysis on user speech, some embodiments may only analyze a user's speech when a sensor detects that the user appears to be addressing the system (e.g., that the user is engaged). In yet other embodiments, a particular pre-set physical user action may tell the system that the user is addressing the system, so that voice analysis may be used. For example, the user may: employ a hand gesture like a piece sign; raise a hand as in a grade school class; hold one eye shut for more than a few seconds; or perform any reasonably distinct physical action. Note that after detecting a pre-set physical action the system may attempt to analyze the user's voice, but if there is no command or instruction in the user's voice, the media presentation may simply continue without interruption. In this manner, there is little or no risk to a false-positive determination that the user is attempting to communicate.

In a similar fashion, the voice analysis may be constantly monitoring the scene but looking for a key word or words to trigger a communication session with a user. For example, the voice analysis may scan for the name Siri, or "hey Siri." In any event, once the system recognizes that the user desires to communicate, the communication can take place in any known manner. Differing embodiments of the invention may employ voice recognition or gesture recognition or a combination of both techniques.

Gesture recognition. Many embodiments of the invention employ gesture recognition to allow users to communicate with the system. Gestures generally refer to motions of the body or limbs made to express meaning to the system (or potentially other users). Some embodiments of the invention use novel techniques for detecting and deciphering fine hand and finger motions in order to allow for communication between a human and a computerized system. These embodiments are discussed in more detail below. These fine hand gestures may be used in combination with other gestures and voice or other communication techniques in order to allow users more flexibility and greater vocabulary in system communication.

Engagement Analysis

Figure 11:
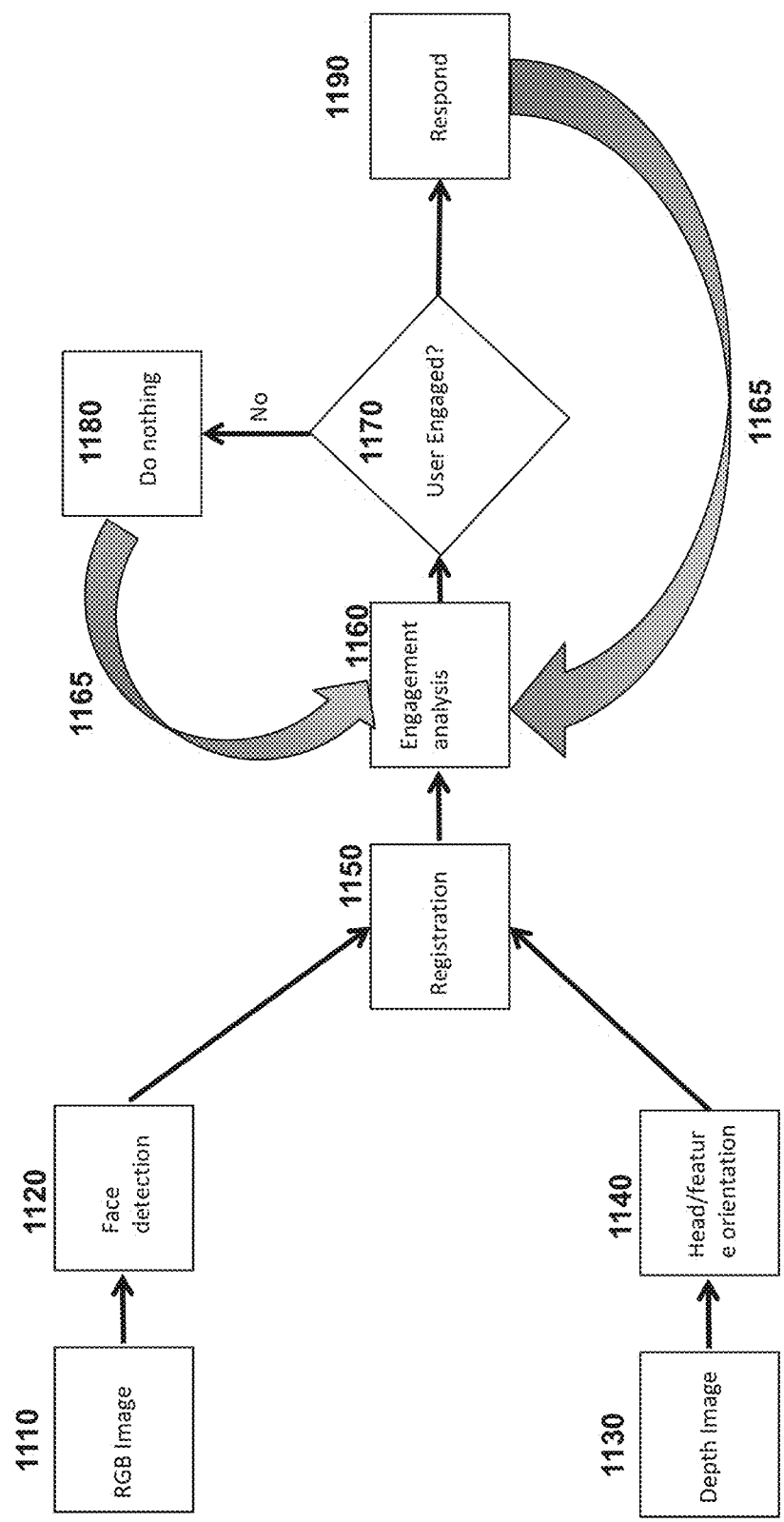
FIG. 11 shows an example process for analyzing user engagement.

Referring to FIG. 11, there is shown a process for determining whether a user in the scene is engaged with the system (i.e., trying to communicate with the system). The process of FIG. 11 illustrates the use of an RGB sensor and a depth sensor, but varying embodiments of the invention contemplate use of other sensors as will be apparent to the skilled artisan in view of the following explanation. Referring to FIG. 11, an RGB image 1110 and a depth image 1130 are respectively employed for face detection 1120 and head orientation detection 1140. A registration is performed at 1150 to align the face detection results with the head orientation results. The registration provides information so that a more precise facial feature may be accurately paired with a more precise head orientation. This added information may be used during engagement analysis 1160 to more accurately determine if the user is engaging the system. For example, if the user is speaking as the user's head orientation is moving toward the system, then the intent to engage is more likely. If the user is speaking as the head orientation leans toward another user, the user's intent is more likely conversation. If the engagement analysis 1160 determines that the user is not engaged 1170, then the system need not do anything 1180. If the engagement analysis 1160 determines that the user is engaged 1170, then the system should respond. For example, if the user is asking to increase the volume, then the system should increase the volume.

Some embodiments of the invention contemplate the use of learning loops 1165, which augment the engagement analysis 1160 with information learned from successes and failures in prior activity when responding 1190 or not responding 1180. In some embodiments that employ learning loops 1165, the system keeps a record of its engagement analysis and responsive action (or not). When a user provides express instructions through any interface with the system, a review of the recently prior engagement analysis is undertaken in an attempt to match prior engagement analysis with the express user instruction. If a match is made, the engagement analysis 1160 is altered in order to learn the user's behavior. In one embodiment, the engagement analysis is tailored to specifically-identified users (i.e., the user is identified and the analysis is customized to the user). In these embodiments, the learning loops can be used for both general learning and to augment the system's analysis capability with respect to a single identified user.

As previously mentioned, other sensor or image combinations or configurations may be used in a configuration similar to FIG. 11. For example, the depth image may be employed to evaluate other features of the human body such as limbs or fine hand and finger movements. The RGB (or other sensor) might then be used to focus on the same body portion (e.g., in the case of fine hand gestures to confirm the gesture) or to remain on the face so that facial expression may be analyzed relative to other body activity (e.g., facial expression of someone raising their hand for attention).

User Settings

In some embodiments, any of the system's behaviors may be defined, coached, or otherwise affected by user settings. A user may, for example, set the system to listen for instructions when two fingers are displayed on the user's right hand. Similarly, all system users may pre-identify themselves to the system so that that an identifiable face may be matched with a set of preferences for system settings such as volume, content preferences, audio sound (e.g., equalizer) settings or any other parameter that may be altered in the system. In this manner, when the system recognizes a face, the settings can be altered to the user's pre-selected preferences. Similarly, the system can be set to react to groups so that when a group of multiple pre-defined faces is detected a corresponding settings state can be implemented.

Recommendations

Figure 12:
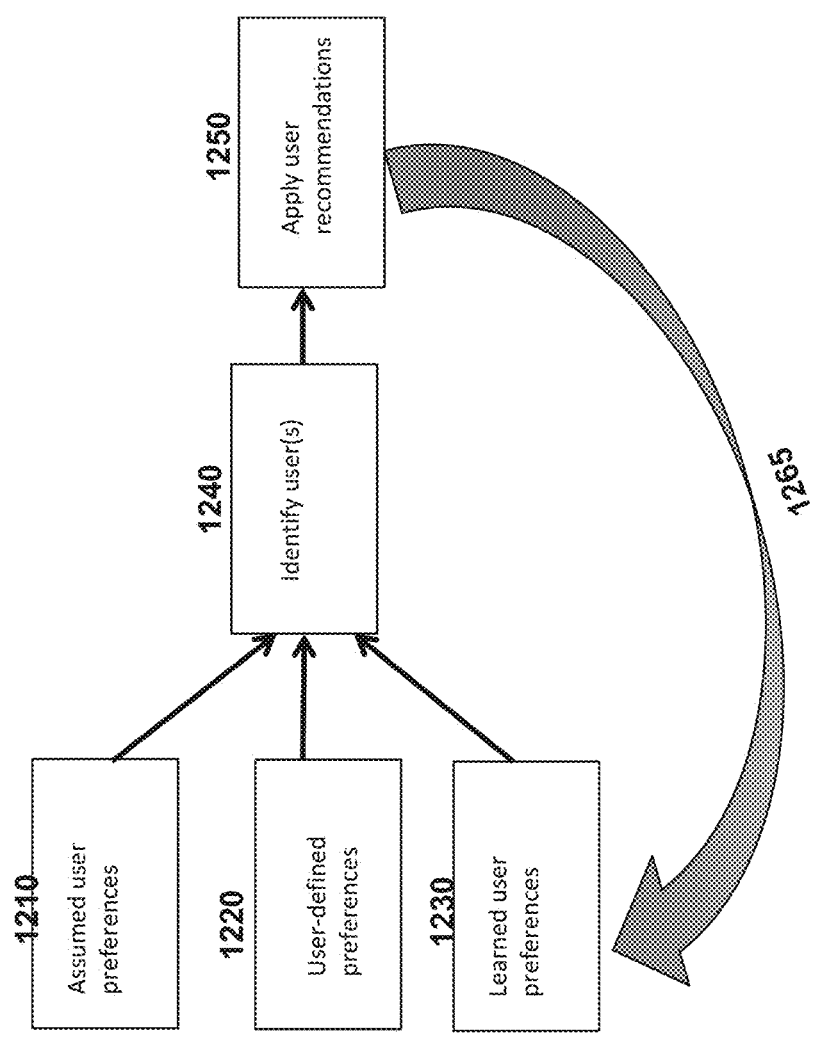
FIG. 12 shows an example process for using recommendations.

Whether the users in a particular scene are positively identified or simply assumed or guessed by the system, inferences may be made about the group so that the system may make suggestions and recommendations. FIG. 12, shows a process for providing recommendations to users. At 1210, 1220, and 1230, user preferences are collected and stored. These preferences may regard a user's preferred media, media genre, preferred consumer products, preferred personal services and any other preference that might apply to a person. In some embodiments of the system, preferences are tracked through three different subsystems. Assumed user preferences 1210 are user preferences that are assumed or derived based upon information detected by the system. For example, if the system detects a child or children, some assumed preferences might be toys, cartoons, and grade-school books. Alternatively, if the system detects children and adults, a family may be inferred and assumed preferences may relate to families (e.g., family games, family media content, family needs). Generally, differing embodiments of the invention may detect any feature of a user that is visible to the sensors including, without limitation, approximate age, race, gender, size, and shape. The detected information may be matched with statistics or marketing information to determine a set of assumed preferences for the user(s).

User-defined preferences 1220 include the user's preferences that are expressly entered by the user (e.g., though a GUI or through the voice or gesture input of the system). In some embodiments, user-defined preferences take precedence over other preferences because the source is the most reliable. In addition, learned user preferences 1230 are user preferences that are observed by the system. For example, if an identified user always watches sports or navigates to sports-themed web sites, then the system may learn that that particular user prefers sports. Of course, the system may learn anything about a user that may be inferred through the user's interaction with the system including watching or listening to media, using the Internet, using productivity applications or other applications of the system, including games.

Referring again to FIG. 12, the system identifies users at 1240, either expressly or by assumption. In some embodiments, if the user can be specifically identified, then preferences are applied for the specific person. If the system cannot identify a specific person then an assumed person is detected including whatever detectable characteristics the system may gather (e.g., age, gender, race, etc.). In some embodiments, users may be identified in groups to attempt to provide preferences for the group rather than an individual. For example, if one male and one female adult are detected (and perhaps if they are located close together), the system may assume they are a couple and reference preferences for a couple rather than preferences for each of two individuals.

After users are identified, the preference information is used to make recommendations 1250 to the users. Recommendations may regard any type of service (physical or information) or item that is deliverable to a user or group of users. In the context of an entertainment system, recommendations may include media (e.g., movies, songs, TV shows), goods (e.g., clothing, appliances), consumable goods (packaged or deliverable foods), services (e.g., cleaning, repair, or entertainment, etc.). The recommendations may be presented in any manner within system capability. Some embodiments present recommendations visually on a system screen, while other embodiments use audible capability to announce the recommendation.

Fine Gesture Detection

Figure 13:
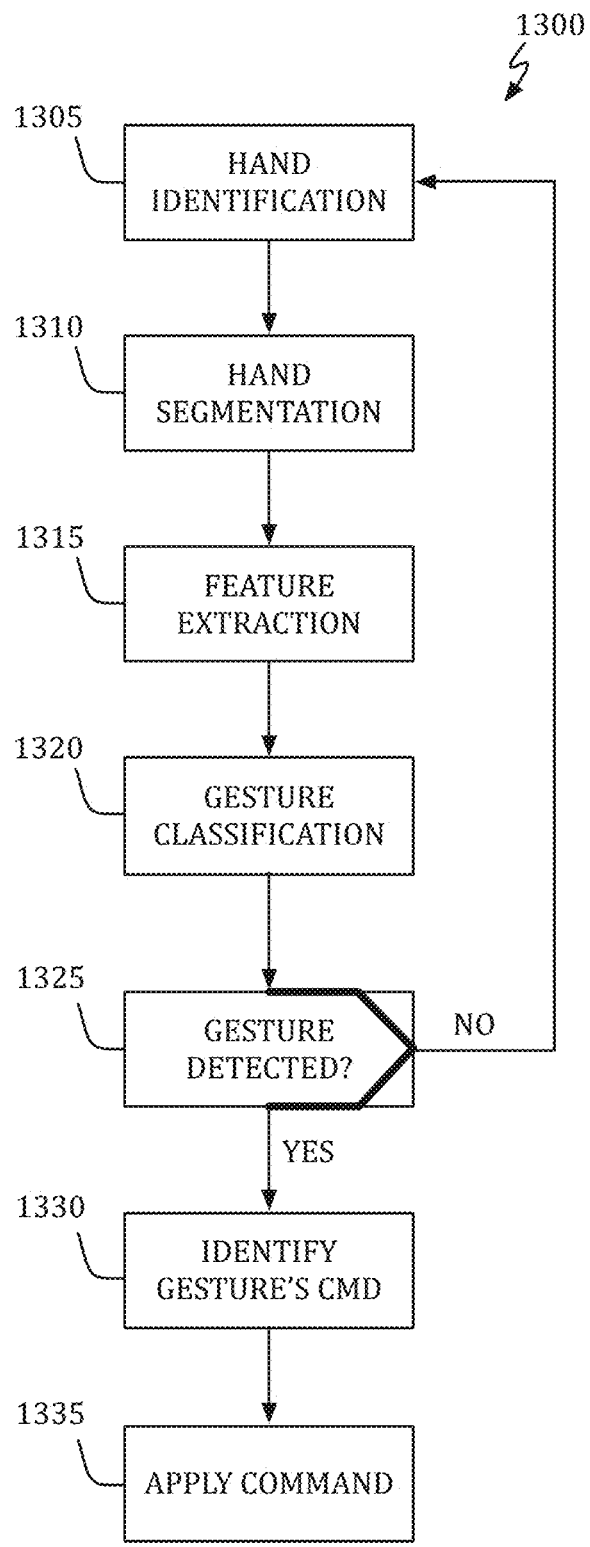
FIG. 13 shows, in flowchart form, a gesture identification operation in accordance with one embodiment.

As discussed above, some embodiments of the invention relate to detecting gestures made by the hands of a human user. Referring to FIG. 13, gesture identification operation 1300, in accordance with one embodiment, uses real-time three-dimensional (3D) sensor data to identify one or more candidate 3D hand structures, hereinafter referred to as a "hand" or "hands" (block 1305). Once detected, a hand may be segmented or trimmed of all non-hand elements (block 1310). Each segmented hand can be described in terms of its 3D structure to generate a feature vector (block 1315) that can be applied to a gesture classification engine (block 1320). If the proposed gesture corresponds to a prior-defined gesture (the "YES" prong of block 1325), the identified gesture's corresponding command may be determined (block 1330) and applied (block 1335). By way of example, if the detected 3D hand structure corresponds to a "swipe" motion the matching command may be a "move" operation as applied to an object displayed to the user making the gesture. Returning to block 1325, if the proposed gesture does not correspond to a prior-defined gesture (the "NO" prong of block 1325), gesture identification operation 1300 begins anew at block 1305.

Figure 14:
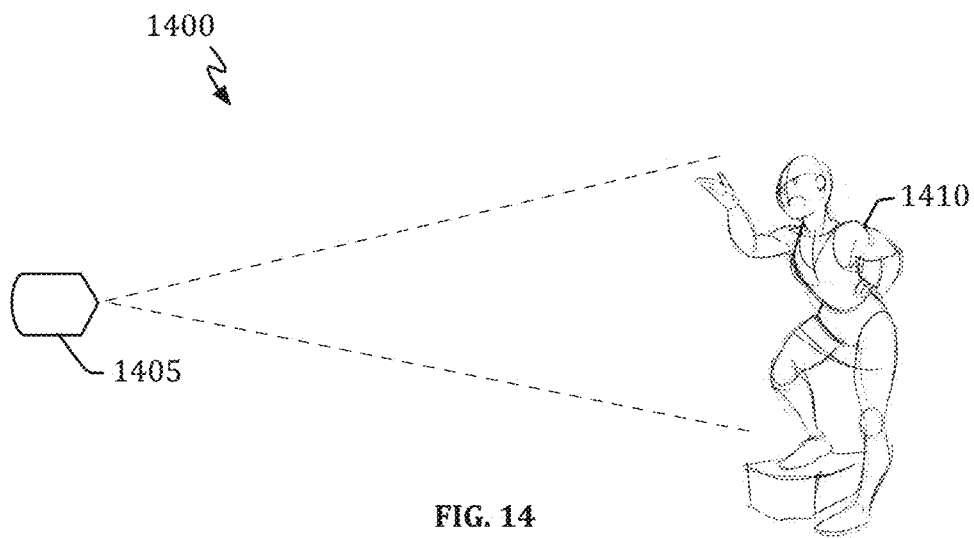
FIGS. 14 and 15 illustrate a three-dimensional image system in accordance with one embodiment.
Figure 15:
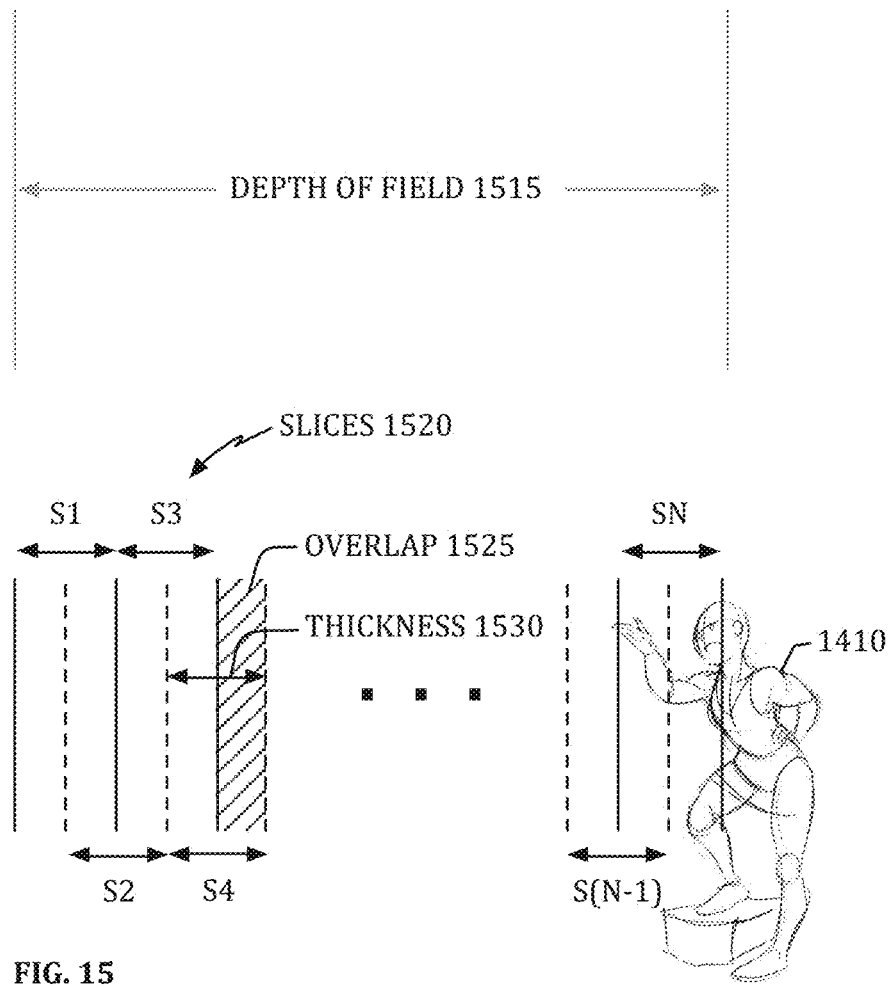

Referring to FIG. 14, in one embodiment, 3D region 1400 is sensed by 3D image sensor system 1405 where region 1400 includes individual 1410 making a hand gesture and a depth of field 1515. Referring to FIG. 15, in one embodiment, sensor data of region 1400 captured by 3D image sensor system 1405 may be analyzed slice-by-slice wherein depth of field 1515 can be divided into N slices 1520 (S1, S2, . . . SN). As shown, in some embodiments, each slice 1520 has overlap 1525 with an immediately prior slice and a thickness 1530. It will be understood by one of ordinary skill in the art that the precise number of slices 1520, each slice's thickness 1530 and the amount of overlap 1525 between slices are all parameters selected by the system designer to meet the constraints and capabilities of the system's components and the system's intended use. In general, slice thickness 1530 should be "thick" enough to engulf an individual's hand (or other target object as discussed below) but not so thick as to include an excess amount of other structure so as to make hand detection more difficult. In one embodiment each slice may have a thickness of between 7 and 50 centimeters. In another embodiment, different slices may have different thicknesses. In similar fashion, the amount of overlap 1525 between consecutive slices is also subject to the designer's goals and system constraints. While, in certain embodiments, some overlap has been determined to be beneficial, slice overlaps between 0% and 75% are often most useful for such embodiments. In addition, the amount of overlap between consecutive slices need not remain constant. That is, some slices may have very little to no overlap while other slices may have high levels of overlap (e.g., greater than 50%).

Three-dimensional sensor data acquisition in accordance with this disclosure may use any of a variety of optical and/or non-optical sensors. Optical sensors use light to carry depth information and include, for example, laser triangulation sensors and stereo vision systems. Non-optical sensors include acoustic (e.g., ultrasonic and seismic) sensors and electromagnetic (e.g., infrared, ultraviolet, microwave) sensors. These techniques typically measure distances to objects by determining the time required for a pulse of sound or electromagnetic energy to bounce back from an object.

Figure 16:
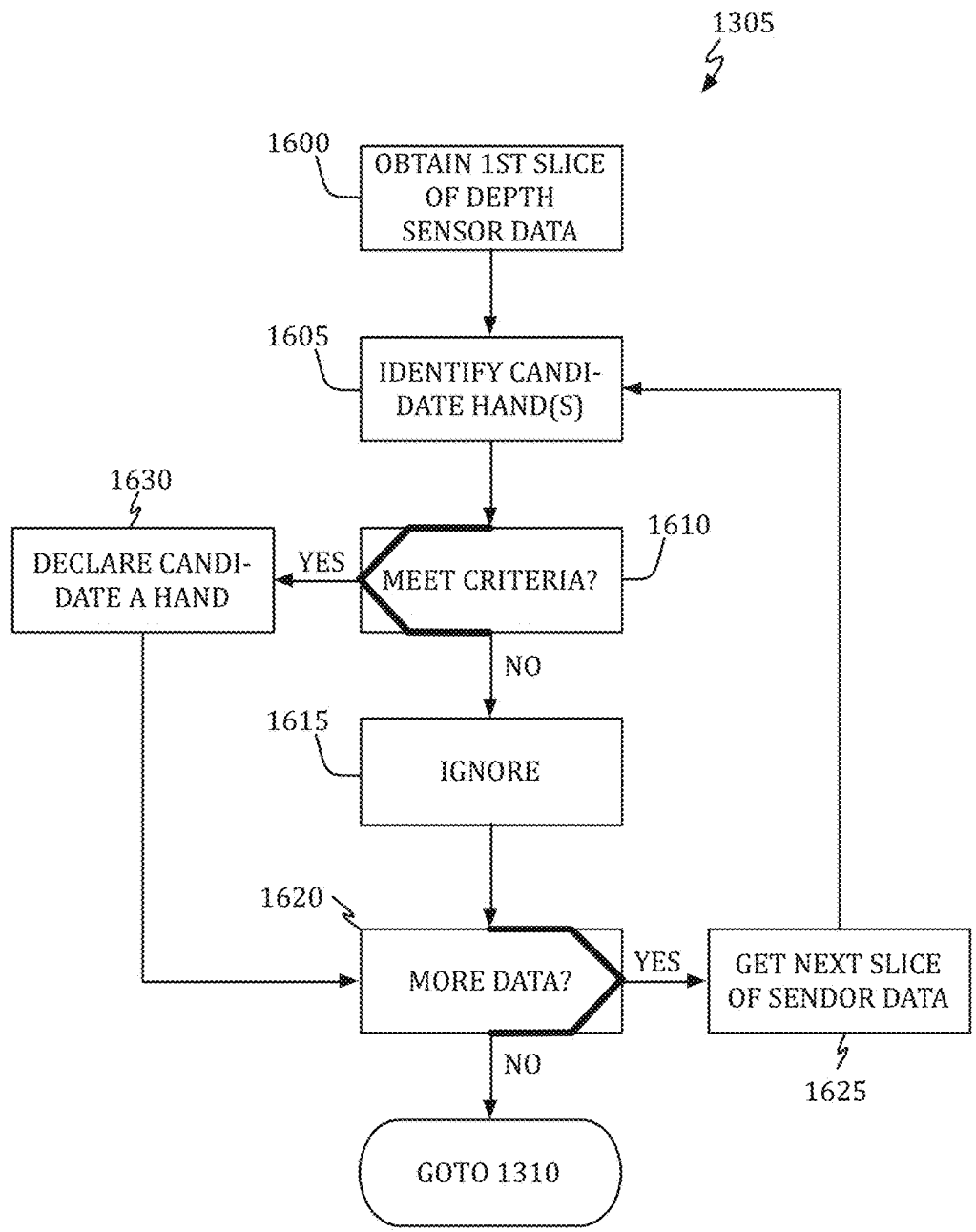
FIG. 16 shows, in flowchart form, a hand identification operation in accordance with one embodiment.
Figure 17:
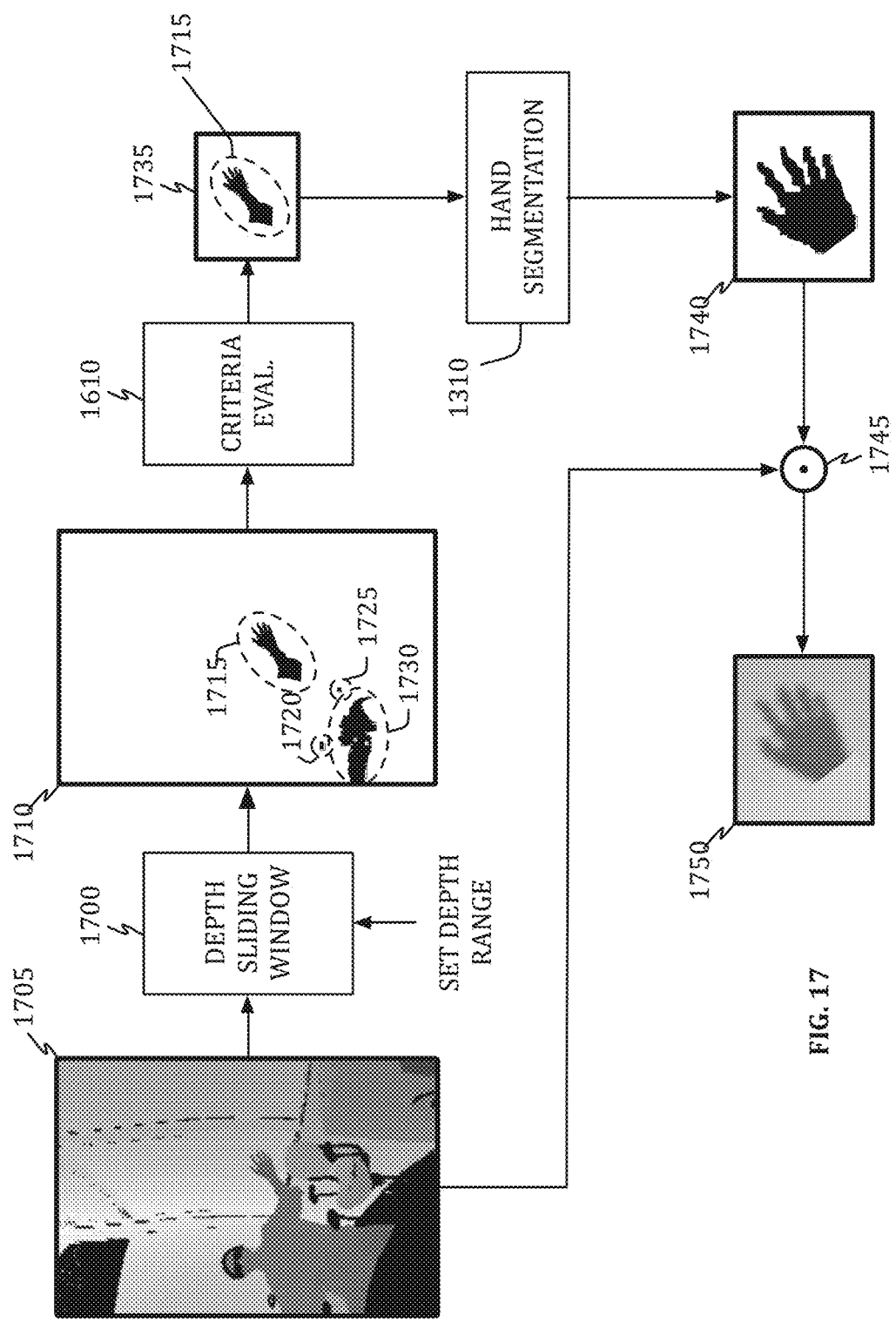
FIG. 17 illustrates a candidate hand mask generation operation in accordance with one embodiment.

Referring to FIG. 16, 3D hand identification operation in accordance with block 1305 may obtain 3D data corresponding to a first slice of data (block 1600). Once obtained, every pixel in a mask corresponding to a pixel in the current slice's 3D sensor data that has a depth value that corresponds to the current slice's range of depth values may be set to '1' and all other pixels set to '0.' By way of example and referring to FIG. 17, after setting the depth range corresponding to the current slice on depth sliding window 1700 (e.g., 75 to 90 centimeters in front of 3D image sensor system 1405), 3D sensor data 1705 may be applied to depth sliding window 1700 to generate mask 1710. In this embodiment mask 1710 will have a '1' value in every location where the corresponding pixel in 3D sensor data 1705 has a depth value that is within the current slice (e.g., having a depth value of between 75 and 90 centimeters) as evidenced by regions 1715-1730, and a '0' everywhere else. Returning to FIG. 16, those regions in 3D sensor data 1705 corresponding to mask 1710's '1' values may be examined, for instance, using connected component analysis to identify possible hand structures ("candidate hands") (block 1605). Identified candidate hands (e.g., regions 1715-1730) may thereafter be compared against various criteria to determine whether they can be considered to represent an actual hand (block 1610). If a candidate hand does not meet the specified criteria (the "NO" prong of block 1610), the data may be ignored (block 1615) after which a check can be made to determine if additional sensor data remains to be analyzed—i.e., another "slice" (block 1620). If more sensor data is available (the "YES" prong of block 1620), the next slice of data can be obtained (Block 1625), whereafter 3D hand identification operation 1305 continues at block 1605. If, on the other hand, a candidate hand meets the specified criteria (the "YES" prong of block 1610), the data may be declared a hand (block 1630) after which processing continues at block 1620.

Figure 18:
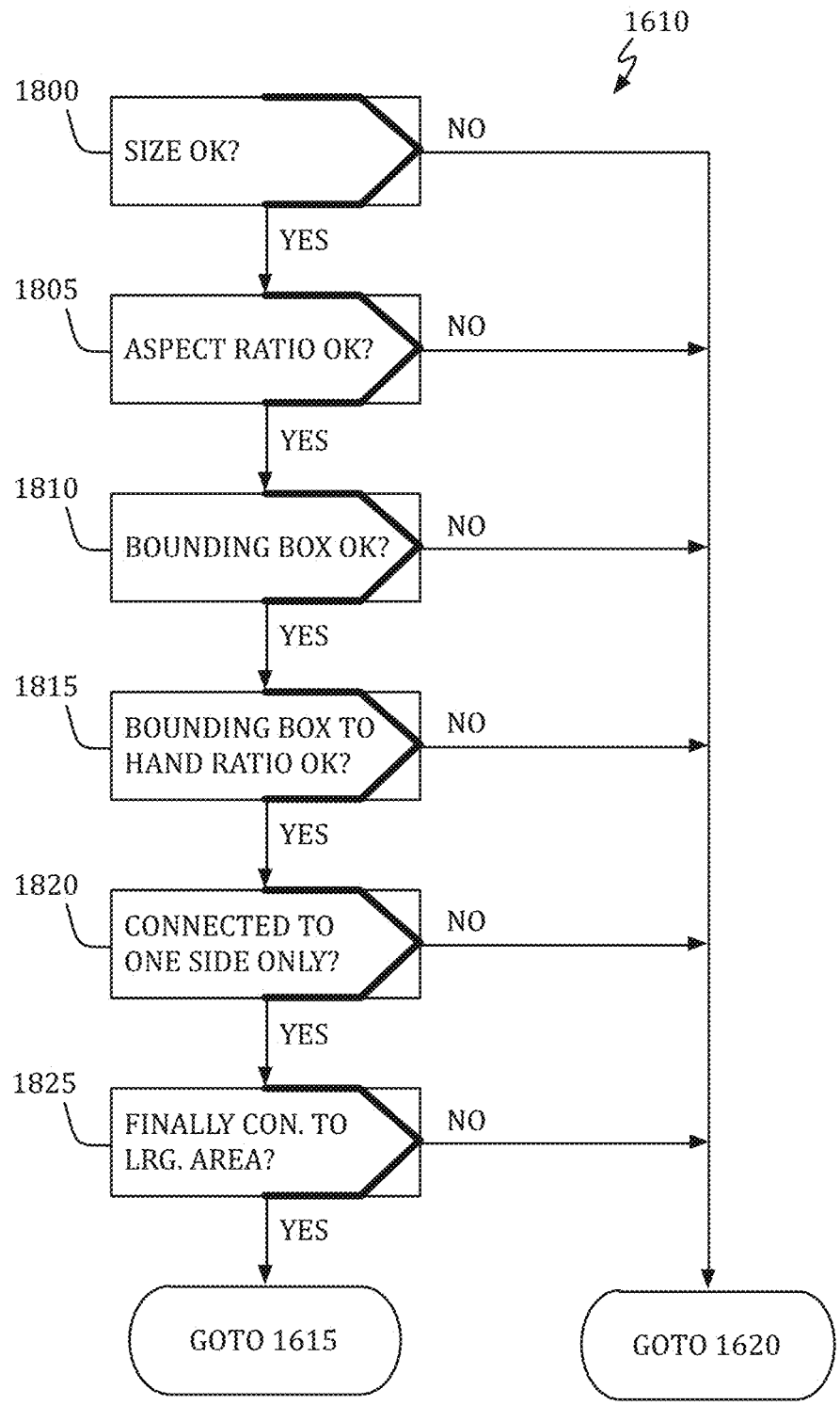
FIG. 18 shows, in flowchart form, a candidate hand criteria check operation in accordance with one embodiment.

Referring to FIG. 18, candidate hand criteria check operation 1610 in accordance with one embodiment includes a number of evaluations. By way of example only, checks may include: the size (e.g. measured in pixels), of the candidate hand (block 1800) of regions 1715-1730 within mask 1710; the candidate hand's aspect or length-to-width ratio (block 1805); the size of the candidate hand's bounding box (block 1810) (e.g., the size of a box that is 'n' pixels 'above' the top-most pixel of the candidate hand's connected component, 'n' pixels 'below' the bottom-most pixel of the candidate hand's connected component, 'n' pixels 'left' of the left-most pixel of the candidate hand's connected component, and 'n' pixels 'right' of the right-most pixel of the candidate hand's connected component, where 'n' is an arbitrary number and may vary from top to bottom and left to right); the relative size of the bounding box to the candidate hand's size or bounding box-to-hand ratio (block 1815); whether the candidate hand is connected on one side only (block 1820); and finally whether the hand is eventually connected to a large area representative of an arm, shoulder and/or torso (block 1825). If all of these tests are successful, the candidate hand may be considered a hand and processing may continue at block 1615, otherwise processing may continue at block 1620. In another embodiment, some criteria may be considered more important than others, a condition that may be embodied by weighting the different tests in accordance with their perceived (application-specific) importance. In still another embodiment, only a specified number of the identified criteria need be met. In yet another embodiment, additional criteria may be specified, with or without weights. For example, a check of the intensity value in the corresponding RGB or Infrared channel may be made. In the example embodiment shown in FIG. 17, only region 1715 passes the necessary tests 1800-1825 (weighted or not) to qualify as a candidate hand, 1735.

Figure 19:
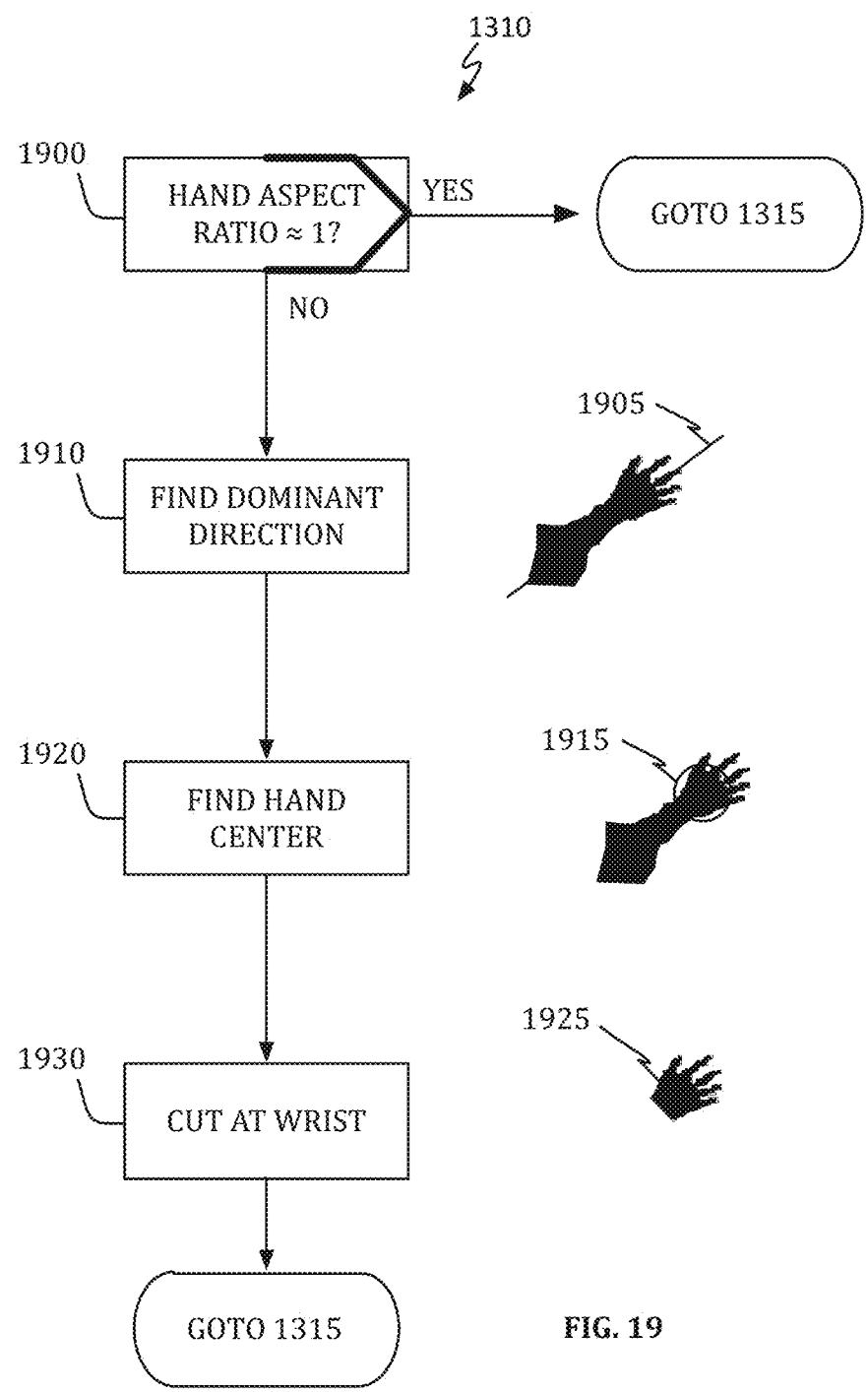
FIG. 19 shows, in flowchart form, a hand segmentation operation in accordance with one embodiment.

Referring now to FIG. 19, Hand segmentation operation 1310 in accordance with one embodiment seeks to remove from a candidate hand (e.g., 1715) areas other than the hand. For example, forearm, upper arm and shoulder. In one embodiment, hand segmentation can begin by checking the aspect ratio of the candidate hand. If that ratio is approximately 1.0 (the "YES" prong of block 1900), segmentation may be deemed unnecessary and processing continues at block 1315 in FIG. 13. In one embodiment, the aspect ratio may be based on a rectangular comparison of the candidate hand (e.g., maximum height in pixels to the maximum width in pixels). In another embodiment, the aspect ratio may be based on a comparison of an ellipse's maximum radius to minimum radius, where the ellipse is set to just include all of candidate hand region 1715. In some embodiments, the ratio of hand size to the size of the hand's bounding box that has been found useful is 0.5 to 1.0. If the candidate hand's aspect ratio is determined to be outside an acceptable range (the "NO" prong of block 1900), the candidate hand may get trimmed/segmented. In one embodiment, hand segmentation 1310 may be a three-step process: find the dominant direction of the candidate hand using, for example, principal component analysis 1905 (block 1910). Once the dominant direction is identified, the two ends forming the dominant direction may be checked: the end surrounded by empty space may be considered the "finger portion" and the other end may be considered the "arm portion." Next, the center of the hand may be detected 1915 (block 1920). In one embodiment, the hand center operation may find the widest distance in the hand region (where the hand may be assumed to be wider than the wrist). The hand center may then be set equal to that pixel that is in the middle of the maximum width. In another embodiment, a distance transform may be used to convert a "widest" measure to a hand center. Such a transform may take into account dominant direction 1905 as well as other factors. By way of example only, in one embodiment hand candidate region (ImageHand) is a binary image and a distance transform map (ImageDT) may be set to the same size as ImageHand. Each pixel in ImageDT labels the pixel which is at the same position in ImageHand with the distance to the nearest boundary pixel. Noting that the size of human hands falls within a fairly narrow range, for example between handMin and handMax, going from the "finger portion" end of ImageHand along the dominant direction at the distance between handMin and handMax, the maximum value (e.g., in pixels) in the distance transform map may be found. For example, if the maximum value is maxValue and its location is maxPos, then maxPos can be taken as the hand's center and maxValue may be used as the specified distance. The segmentation location can, in one embodiment, be set to (maxValue+maxPos) that is computed along the dominant direction from the finger portion end of the candidate hand. Finally, the hand may be segmented at the wrist orthogonal to the dominant direction and at a specified distance from the hand center. The specified distance may again be generated in accordance with a distance transform. Once cut, hand region 1925 has been isolated (block 1930). This process may also be seen in FIG. 17 in which candidate hand region 1715 is segmented in accordance with block 1310 to generate segmented hand region 1740. In the illustrated embodiment, segmented hand region 1740 comprises a binary mask that may be applied to 3D sensor data 1705 (block 1745) to isolate that 3D sensor data corresponding to mask 1740, hand depth map 1750. It is noted that, in one embodiment, had there been more than one hand region identified as a candidate hand, segmented hand region 1740 would have been a mask of all such hands. Once detected and trimmed (if needed), in one illustrative implementation the size of segmented hand region 1740 may be normalized.

Referring again to FIGS. 15 and 16, if region 1400 has not been fully evaluated, the next 3D slice may be obtained (block 1625). As noted above, repeated hand identification operation 1305 in accordance with FIG. 16 may result in multiple hands being detected. In one embodiment, each detected hand may be evaluated separately as discussed below. In another embodiment, all detected hands may be combined. In one embodiment, this combination may be implemented as the sum of all such regions (e.g., the logical AND of all segmented hand regions).

With a properly segmented hand region's 3D sensor data, feature extraction in accordance with block 1315 may proceed. In one embodiment, a goal of feature extraction operation 1315 is to determine an abstracted representation of the identified hand—taking into account its 3D structure—so that it may be used to distinguish different gestures. In general, a good representation should be discriminative, invariant and efficient. A discriminative representation is one that is effective in distinguishing one gesture from another. Another way to say this is that different hands making the same gesture should appear close in the gesture's feature space while different hands making different gestures should be far away from one another. An invariant feature representation is one that is relatively constant to different people with different hands and different ways of making the same gesture. A desired representation should be efficient, compact, easy to determine and require minimal storage.

Figure 20:
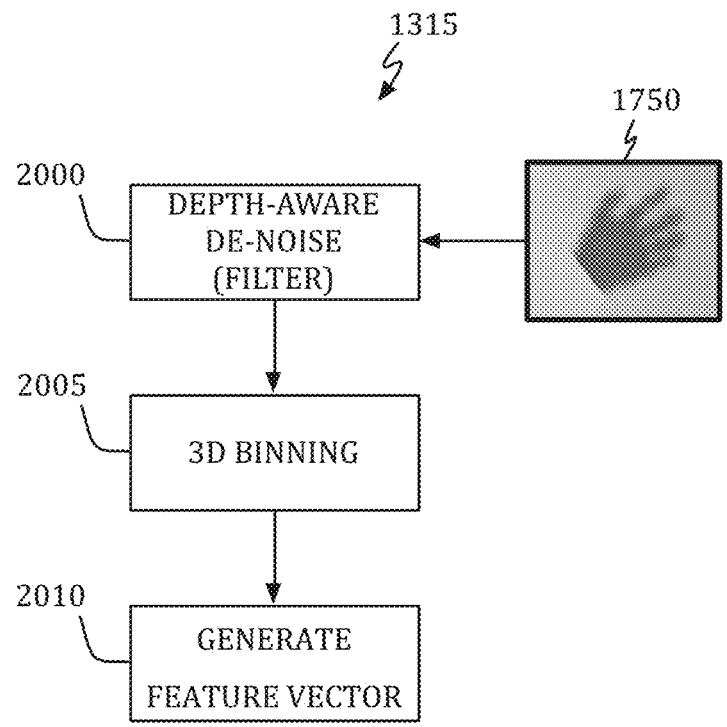
FIG. 20 shows, in flowchart form, a feature extraction operation in accordance with one embodiment.

Referring to FIG. 20, feature extraction operation 1315, in accordance with one embodiment as applied to the identified hand's depth map 1750, may begin with depth-aware denoising operation 2000. Depth data 1750 is typically noisy and thus requires filtering. Previous approaches, however, have applied Gaussian or other averaging techniques directly to hand depth map 1750, which could possibly pollute pixels along the edges by mixing them with background pixels. In depth-aware filtering as disclosed herein, only average pixels that are close both spatially and in depth are averaged.

Figure 21:
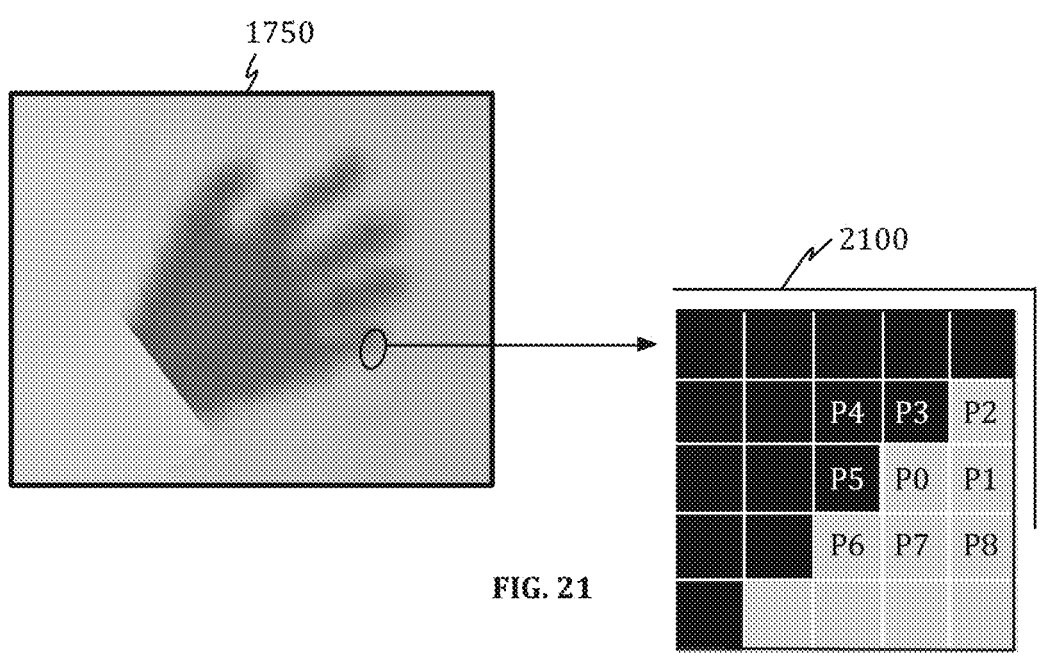
FIG. 21 illustrates a depth-aware filtering approach in accordance with one embodiment.

Referring to FIG. 21, in one embodiment, a 5-by-5 area of pixels from hand depth map 1750 along the edge of a finger is selected for filtering centered at pixel $P_0$. While filtering may be applied to all foreground pixels in hand depth map 1750, only pixel $P_0$ is discussed herein. As shown in region 2100, black pixels are taken as background pixels and are at least a specified distance from pixel $P_0$ (determined to be part of the identified hand). By excluding non-hand pixels, only pixels belonging to a common surface (e.g., the finger)

are averaged together. Formally, depth-aware filtering operation 2000 for pixel $P_0$ may be expressed as:

$$P_0 = \sum_i w_i P_i \delta(|P_i - P_0| < \varepsilon), \text{ where} \qquad \text{EQ. 1}$$

$$\delta(|P_i - P_0| < \varepsilon) = \begin{cases} 0 & |P_i - P_0| \geq \varepsilon \\ 1 & |P_i - P_0| < \varepsilon \end{cases}$$

Here, 'i' runs from 0 to 'n,' where 'n' represents the size of the desired neighborhood, $w_i$ represents the weight for the filter, and $\varepsilon$ represents a threshold to control how far away from pixel $P_0$ a given pixel has to be to be considered on a "different" surface. As shown in the illustrative implementation of FIG. 21, 'i' may run from '0' to '8'. In addition, $\varepsilon$ may be between 15 and 30 centimeters (a value highly dependent upon the size of the element being processed; e.g., a hand or a head). One of ordinary skill in the art will recognize that other size neighborhoods are possible and that the specific choice may vary from implementation to implementation.

Figure 22:
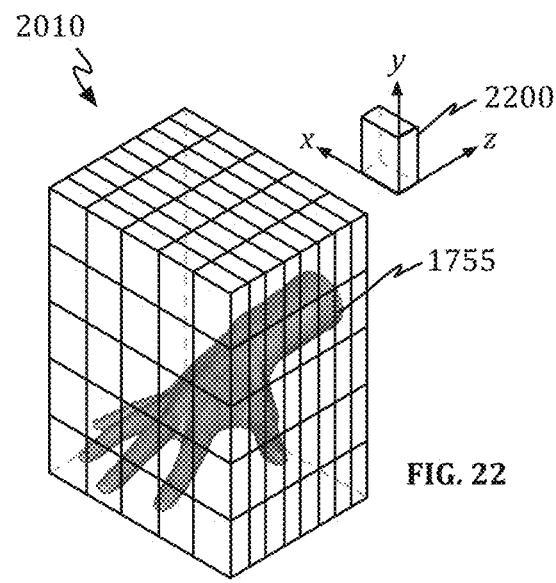
FIGS. 22 and 23 illustrate one approach to representing a hand's volume (depth map) in accordance with this disclosure.

Returning to FIG. 20, once each pixel in hand depth map 1750 has been filtered in accordance with block 2000, the filtered data may be placed into a 3D histogram (block 2005) from which a feature vector may be extracted (block 2010). As illustrated in FIG. 22, hand depth map 1750 may be thought of as forming a point cloud in 3D space. To capture the 3D information about a hand's shape, the space around the hand may be divided into 3D sub-regions 2200; where the value of each sub-region 2200 captures or accumulates the 3D information of all pixels falling within its defined region. In one embodiment, the value of each sub-region 2200 may be set equal to the number of pixels from hand depth map 1750 that are within the sub-region. In another embodiment the value of each sub-region 2200 may be a weighted sum of the sub-region's pixels. For example, those pixels closest to a sub-region's median (or mean) distance may be given more weight whereas pixels further from the sub-region's median (or mean) distance may be given less weight.

As illustrated in FIG. 22, the 3D region about the identified hand may be divided into a number of bins along each axis (x, y, and z). In one embodiment the 3D region about the identified hand may be uniformly divided into a number of bins along each axis. In another embodiment, the number of sub-regions along each axis may be adjusted so that the number of 3D sensor pixels is approximately equal in each sub-region 2200. In yet another embodiment and as illustrated in FIG. 22, the identified hand's 3D region may be uniformly partitioned into equal sized sub-regions along the 'x' and 'y' axis while the size of sub-regions along the 'z' axis may be adjusted so that the number of 3D sensor pixels in each sub-region 2200 is approximately equal. Taking this approach (hereinafter referred to as "density-based binning"), and letting a sub-region's value equal the number of pixels within its boundary, yields histogram 2305 in FIG. 23. More particularly, density-based binning may be used to divide the bins based on the depth distribution of the pixels within the hand's 3D point cloud. In one embodiment, all of the hand's pixels may be ranked based on their depth (aka, depth ranking). Once ranked, the pixels may be uniformly partitioned according to their ranking. This may lead to the non-uniform binning in the depth dimension as identified by indicator 2310 in FIG. 16.

One advantage of this binning method is that it adapts to the shape of a hand; for sub-regions with more pixels, the bin size is smaller to allow it to capture more geometric detail. Regardless of how the hand's region is partitioned (uniformly or non-uniformly), histogram 2305 may be normalized so that all histogram values fall between 0.0 and 1.0 in accordance with:

$$\alpha_i^{normalized} = \frac{\alpha_i^{un\text{-}normalized}}{\sum_i \left(\alpha_i^{un\text{-}normalized}\right)^2}, \qquad \text{EQ. 2}$$

where 'i' runs from 1 to the total number of sub-regions 2200 and $\alpha_i^{un\text{-}normalized}$ represents the raw or un-normalized value of the $i^{th}$ sub-region. By way of example, if an identified hand's 3D region is divided into 5 units along the 'x' axis, 5 units along the 'y' axis and 8 units along the 'z' axis, there will be a total of 5×5×8 or 200 sub-regions 2200. Accordingly, 'i' would run from 1 to 200.

In one embodiment, feature extraction in accordance with block 2010 may be the concatenation of the hand's individual sub-region 2200 values. Continuing the example from above, a feature vector indicative of the hand's gesture would have 200 values, i.e., it would be a feature vector having 200 dimensions. The manner in which these values are combined into a single vector is an implementation detail and may be selected to optimize some later computational operation.

Figure 23:
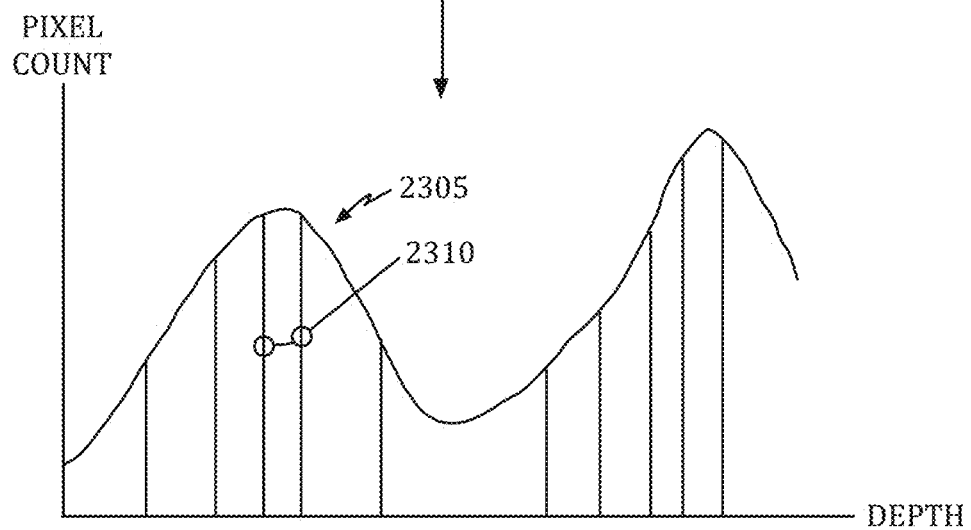
Figure 24:
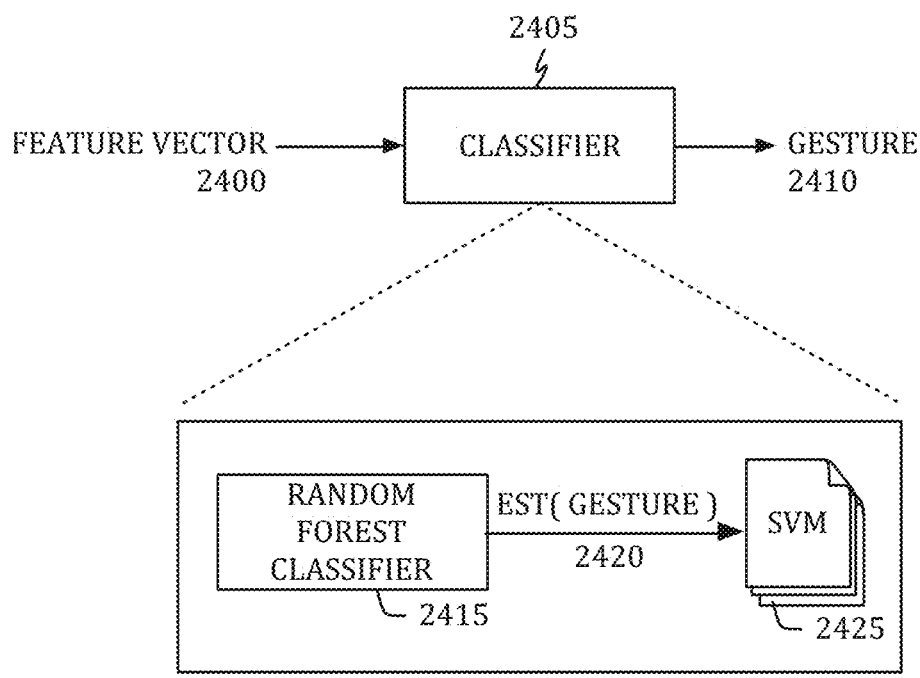
FIG. 24 shows, in block diagram form, a two-stage gesture classifier in accordance with one embodiment.

Referring to FIG. 24, during normal run operations of system 1405, feature vector 2400, determined in accordance with FIGS. 22 and 23, may be applied to classifier 2405, which identifies the gesture 2410. Gesture 2410 may then be used to initiate an action such as, for example, the modification of a system's operational parameter (e.g., increasing or decreasing the audio volume of system 1405 or the rotation of an image displayed on a display device). As shown in one embodiment, classifier 2405 may include random forest classifier 2415 (used to generate estimated gesture 2420) and a plurality of single class support vector machines 2425—one for each predetermined gesture. Random forest classifier 2415 may be trained off-line with a number of samples of each type of gesture system 1405 is designed to recognize. In one embodiment, classifier 2405, designed to recognize 5 different gestures, may use 10,000 feature vectors representing each gesture and another 10,000 feature vectors that represent none of the 5 predetermined gestures to train random forest classifier 2415. Similarly, each gesture-specific SVM 2425 may use another 10,000 feature vectors representative of its unique gesture. In operation, feature vector 2400 may be applied to random forest classifier 2415 which returns estimated gesture 2420. Estimated gesture 2420 may then be applied to each gesture-specific SVM 2425. That SVM returning the largest likelihood may be selected as the detected gesture. In another embodiment, that SVM returning the largest value that is at least greater than a specified value may be selected as the detected gesture. In yet another embodiment, if no SVM output is more than a threshold value, a gesture not relevant to the predetermined gestures may be indicated. One of ordinary skill in the art will recognize that the number of training samples, the number of gestures, and the means of interpreting SVM 2425 output may be unique to each implementation's goals and/or constraints. For example, for a system in which low false identifications are desired, the number of training samples may be very much larger than the 10,000 indicated here. Generally speaking, random forest classifier 2415 provides an initial classification of different gestures while the gesture-specific (one class) SVM 2425 provides a second stage verification to make sure the final results are correct.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Further, FIGS. 5, 6, 10, 11, 12, 13, 16, 18, 19, and 20 show flowcharts illustrating various aspects of the disclosed embodiments. In one or more embodiments, one or more of the disclosed steps may be omitted, repeated, and/or performed in a different order than that described herein. Accordingly, the specific arrangement of steps or actions shown in FIGS. 5, 6, 10, 11, 12, 13, 16, 18, 19 and 20 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
   acquire a depth image of a scene in a vicinity of a first device;
   store the depth image in a memory;
   develop a scene geometry based upon the depth image, wherein the scene geometry includes a plurality of surfaces, and wherein each surface is associated with an acoustic reflectance characteristic that is detected by the first device;
   monitor the activity of one or more humans present in the scene geometry, wherein one of the one or more humans comprises a user of the first device;
   determine whether the user is engaging the first device;
   in response to a determination that the user is not engaging the first device, infer a user intent based upon a monitored user activity; and
   adjust an audio output of the first device based, at least in part, upon the inferred user intent, the user's location in the scene, and an acoustic reflectance characteristic of at least one surface in the scene geometry.

2. The non-transitory programs to rage device of claim 1, wherein the instructions stored thereon further cause the one or more processors to: detect a plurality of surfaces in the scene by employing plane fitting to the depth image.

3. The non-transitory program storage device of claim 1, wherein the instructions stored thereon further cause the one or more processors to:
   acquire an image of the scene;
   detect a human face in the acquired image;
   employ the depth image to detect a head orientation associated with the detected human face; and
   correlate the detected human face with the head orientation.

4. The non-transitory program storage device of claim 3, wherein the instructions stored thereon further cause the one or more processors to:
   determine whether the user is engaging the first device based, at least in part, upon the correlated detected human face and the head orientation.

5. The non-transitory program storage device of claim 1, wherein the instructions stored thereon further cause the one or more processors to:
   identify a plurality of humans in the scene;
   determine preferences associated with at least one of the identified plurality of humans; and
   make recommendations based upon the determined preferences.

6. A method, comprising:
   acquiring a depth image of a scene in a vicinity of a first device;
   storing the depth image in a memory;
   developing a scene geometry based upon the depth image, wherein the scene geometry includes a plurality of surfaces, and wherein each surface is associated with an acoustic reflectance characteristic that is detected by the first device;
   monitoring the activity of one or more humans present in the scene geometry, wherein one of the one or more humans comprises a user of the first device;
   determining whether the user is engaging the first device;
   in response to a determination that the user is not engaging the first device, inferring a user intent based upon a monitored user activity; and
   adjusting an audio output of the first device based, at least in part, upon the inferred user intent, the user's location in the scene, and an acoustic reflectance characteristic of at least one surface in the scene geometry.

7. The method of claim 6, further comprising: detecting a plurality of surfaces in the scene by employing plane fitting to the depth image.

8. The method of claim 6, further comprising:
   acquiring an image of the scene;
   detecting a human face in the acquired image;
   employing the depth image to detect a head orientation associated with the detected human face;
   correlating the detected human face with the head orientation; and
   determining whether the user is engaging the first device based, at least in part, upon the correlated detected human face and the head orientation.

9. The method of claim 6, further comprising:
   identifying a plurality of humans in the scene;
   determining preferences associated with at least one of the identified plurality of humans; and
   making recommendations based upon the determined preferences.

10. An electronic device comprising:
    a memory;
    a depth sensor;
    one or more processors, communicatively coupled to the memory, wherein the memory stores instructions to cause the one or more processors to:
       acquire, from the depth sensor, a depth image of a scene in a vicinity of the electronic device;
       store the depth image in the memory;
       develop a scene geometry based upon the depth image, wherein the scene geometry includes a plurality of surfaces, and wherein each surface is associated with an acoustic reflectance characteristic that is detected by the first device;
       monitor the activity of one or more humans present in the scene geometry, wherein one of the one or more humans comprises a user of the electronic device;

determine whether the user is engaging the electronic device;

in response to a determination that the user is not engaging the electronic device, infer a user intent based upon a monitored user activity; and adjust an audio output of the electronic device based, at least in part, upon the inferred user intent, the user's location in the scene, and an acoustic reflectance characteristic of at least one surface in the scene geometry.

11. The electronic device of claim 10, wherein the instructions stored in the memory further cause the one or more processors to: detect a plurality of surfaces in the scene by employing plane fitting to the depth image.

12. The electronic device of claim 10, wherein the instructions stored in the memory further cause the one or more processors to:

acquire an image of the scene;

detect a human face in the acquired image;

employ the depth image to detect a head orientation associated with the detected human face; and correlate the detected human face with the head orientation.

13. The electronic device of claim 12, wherein the instructions stored in the memory further cause the one or more processors to:

determine whether the user is engaging the electronic device based, at least in part, upon the correlated detected human face and the head orientation.

14. The electronic device of claim 10, wherein the instructions stored in the memory further cause the one or more processors to:

identify a plurality of humans in the scene;

determine preferences associated with at least one of the identified plurality of humans; and make recommendations based upon the determined preferences.

\* \* \* \* \*